United States Patent
Liu

(10) Patent No.: US 10,701,547 B2
(45) Date of Patent: Jun. 30, 2020

(54) DATA TRANSMISSION METHOD, NETWORK DEVICE, TERMINAL DEVICE, AND BASE STATION

(71) Applicant: HUAWEI TECHNOLOGIES CO., LTD., Shenzhen, Guangdong (CN)

(72) Inventor: Yalin Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/158,681

(22) Filed: Oct. 12, 2018

(65) Prior Publication Data

US 2019/0053036 A1  Feb. 14, 2019

Related U.S. Application Data

(63) Continuation of application No. PCT/CN2017/075035, filed on Feb. 27, 2017.

(30) Foreign Application Priority Data

Apr. 13, 2016  (CN) .......................... 2016 1 0231994

(51) Int. Cl.
*H04L 29/12* (2006.01)
*H04W 8/08* (2009.01)
(Continued)

(52) U.S. Cl.
CPC ........... *H04W 8/08* (2013.01); *H04L 61/2503* (2013.01); *H04W 8/06* (2013.01); *H04W 8/24* (2013.01);
(Continued)

(58) Field of Classification Search
CPC ....... H04W 8/08; H04W 60/00; H04W 48/14; H04W 8/24; H04W 8/26; H04W 88/02
See application file for complete search history.

(56) References Cited

U.S. PATENT DOCUMENTS 7,843,900 B2  11/2010  Gallagher et al.
2005/0221795 A1  10/2005  Hirabe et al.
(Continued)

FOREIGN PATENT DOCUMENTS

CN  1678125 A  10/2005
CN  101448239 A  6/2009
(Continued)

OTHER PUBLICATIONS

R2-162662, Huawei, HiSilicon, "Low latency and low overhead transmission for NR," 3GPP TSG-RAN WG2 Meeting #93bis, Dubrovnik, Croatia, Apr. 11-15, 2016 (7 pp.).
(Continued)

*Primary Examiner* — Chi Ho A Lee
(74) *Attorney, Agent, or Firm* — Kilpatrick Townsend & Stockton LLP

(57) ABSTRACT

This disclosure includes a data transmission method, a network device, a terminal device, and a base station. In the data transmission method, a target network device receives data sent by a target base station. The data is sent by a terminal device to the target base station, and the data includes identification information of the terminal device. When the target network device acknowledges, by using the identification information, that the terminal device has not been registered with the target network device, the target network device obtains user information of the terminal device. After the target network device obtains the user information of the terminal device, the target network device sends the data to a gateway. By using the data transmission method, the network device, the terminal device, and the base station disclosed in this patent application, the terminal device can still properly perform data transmission during movement.

12 Claims, 13 Drawing Sheets

(51) Int. Cl.
*H04W 8/26* (2009.01)
*H04W 8/06* (2009.01)
*H04W 8/24* (2009.01)
*H04W 48/14* (2009.01)
*H04W 60/00* (2009.01)
*H04W 36/12* (2009.01)
*H04W 88/02* (2009.01)

(52) U.S. Cl.
CPC ............ *H04W 8/26* (2013.01); *H04W 48/14* (2013.01); *H04W 60/00* (2013.01); *H04W 36/12* (2013.01); *H04W 88/02* (2013.01)

(56) References Cited

U.S. PATENT DOCUMENTS

| | | | | |
|---|---|---|---|---|
| 2006/0072537 | A1* | 4/2006 | Lee | H04L 29/12009 370/349 |
| 2008/0019319 | A1* | 1/2008 | Bahini | H04L 29/12018 370/331 |
| 2009/0006585 | A1* | 1/2009 | Chen | H04L 29/12018 709/220 |
| 2009/0141881 | A1* | 6/2009 | Lederer | H04M 3/546 379/201.12 |
| 2009/0296567 | A1* | 12/2009 | Yasrebi | H04L 29/12028 370/221 |
| 2010/0120461 | A1* | 5/2010 | Mori | H04W 48/02 455/517 |
| 2010/0167731 | A1* | 7/2010 | Horodezky | H04W 48/16 455/434 |
| 2010/0202403 | A1* | 8/2010 | Premec | H04W 8/08 370/331 |
| 2010/0208653 | A1* | 8/2010 | Morinaga | H04W 28/08 370/328 |
| 2011/0069659 | A1* | 3/2011 | Kong | H04W 48/06 370/328 |
| 2013/0157659 | A1* | 6/2013 | Ikeda | H04W 12/08 455/435.1 |
| 2013/0171991 | A1 | 7/2013 | Fujino et al. | |
| 2013/0294395 | A1* | 11/2013 | Pison | H04W 12/08 370/329 |
| 2014/0153544 | A1 | 6/2014 | Lu et al. | |
| 2014/0192767 | A1 | 7/2014 | Au et al. | |
| 2014/0328256 | A1 | 11/2014 | Djukic et al. | |
| 2014/0362772 | A1 | 12/2014 | Li et al. | |
| 2015/0208294 | A1 | 7/2015 | Lee et al. | |
| 2015/0358954 | A1* | 12/2015 | Koshimizu | H04W 68/00 370/329 |
| 2016/0150390 | A1 | 5/2016 | Chen et al. | |
| 2018/0279393 | A1 | 9/2018 | Liu | |

FOREIGN PATENT DOCUMENTS

| | | |
|---|---|---|
| CN | 102892109 A | 1/2013 |
| CN | 103200638 A | 7/2013 |
| CN | 103222332 A | 7/2013 |
| CN | 104105155 A | 10/2014 |
| CN | 106817669 A | 6/2017 |
| EP | 2736282 A1 | 5/2014 |
| WO | 2014135126 A1 | 9/2014 |

OTHER PUBLICATIONS

Extended European Search Report, dated Dec. 21, 2018, in European Application No. 17781748.3 (11 pp.).
International Search Report and Written Opinion (Forms PCT/ISA/210, PCT/ISA/220, PCT SA 237); dated Apr. 28, 2017 in corresponding PCT Application No. PCT/CN2017/075035 (11 pages).
International Search Report, dated Apr. 28, 2017, in International Application No. PCT/CN2017/075035 (4 pp.).

* cited by examiner

DATA TRANSMISSION METHOD, NETWORK DEVICE, TERMINAL DEVICE, AND BASE STATION

CROSS-REFERENCE TO RELATED APPLICATIONS

This application is a continuation of International Application No. PCT/CN2017/075035, filed on Feb. 27, 2017, which claims priority to Chinese Patent Application No. 201610231994.7, filed on Apr. 13, 2016. The disclosures of the aforementioned applications are hereby incorporated by reference in their entireties.

TECHNICAL FIELD

This disclosure relates to wireless communication, and more specifically, to a data transmission method, a network device, a terminal device, and a base station.

BACKGROUND

In a typical wireless communications network, for example, a Long Term Evolution (Long Term Evolution, "LTE" for short) network, uplink data transmission is based on scheduling/grant (Scheduling/Grant) mechanism. In the mechanism, user equipment (user equipment, "UE" for short) first sends an uplink scheduling request to a base station. After receiving the scheduling request, the base station sends an uplink grant to the UE, to notify the UE the allocated resource for uplink transmission. Accordingly, the UE transmits data on the allocated resource for uplink transmission.

For a new requirement such as supporting massive access of users, a grant-free (Grant Free) transmission mode is used in a next-generation communications network. Currently there is no appropriate solution for how these terminal devices perform data transmission when the terminal devices move in the network.

It should be noted that, the background descriptions merely help readers further understand this patent application, and constitute no limitation on a usage scope of this patent application. The usage scope of this patent application is not necessarily limited to only a scenario in which a terminal device uses grant-free for transmission when moves in the network.

SUMMARY

In view of this, embodiments of the present invention provide a data transmission method, a network device, and a terminal device, to be applicable to a scenario in which a terminal device moves.

According to a first aspect, an embodiment of the present invention provides a data transmission method. In the transmission method, a target network device receives data sent by a target base station. The data is sent by a terminal device to the target base station, and the data includes identification information of the terminal device. If the target network device acknowledges, by using the identification information, that the terminal device has not been registered with the target network device, the target network device obtains user information of the terminal device. After the target network device obtains the user information of the terminal device, the target network device sends the data to a gateway.

When the terminal device moves, the terminal device sends the data to the target base station, and the target base station sends the data to the target network device. The target network device acknowledges, based on the identification information of the terminal device in the data, that the terminal device has not been registered with the target network device. After the target network device obtains the user information of the terminal device, the target network device sends the data to the gateway. In this way, in a scenario in which the terminal device moves, data transmission can also be performed properly. In the case in which the target network device acknowledges, by using the identification information, that the terminal device has not been registered with the target network device, the target network device obtains the user information of the terminal device, and verifies, by using the obtained user information, whether the terminal device is an authorized user. This ensures secure data transmission of an authorized user, and avoids performing data transmission for an unauthorized user. After the terminal device moves, data transmission is performed properly. In addition, the terminal device does not need to first perform random access before data transmission, so as to reduce a latency.

With reference to the first aspect, in a first possible implementation of the first aspect, the identification information of the terminal device is a source first identifier of the terminal device, and the source first identifier is a first identifier allocated by a source network device to the terminal device. After the target network device obtains the user information of the terminal device, the target network device allocates a new first identifier to the terminal device, and the target network device sends the new first identifier to the terminal device by using the target base station. In this case, the data sent by the terminal device to the target base station may not need to carry an IP address, thereby saving an air interface resource.

In this implementation, after the terminal device moves to a coverage area of the target network device, the target network device acknowledges, by using the source first identifier, that the terminal device has not been registered with the target network device, and the target network device allocates the new first identifier to the terminal device, and sends the new first identifier to the terminal device. In this way, the terminal device can use the new first identifier in subsequent data transmission. There is no need to verify again whether the terminal device is an authorized user, thereby reducing a data transmission time.

With reference to the first possible implementation of the first aspect, in a second possible implementation of the first aspect, if the target network device acknowledges, by using the identification information, that the terminal device has not been registered with the target network device includes: the target network device has not recorded the source first identifier. This provides a technical solution to acknowledging that the terminal device has not been registered with the target network device, and the acknowledging method is relatively simple and quick. This is especially applicable to a scenario in which there is no possibility that the first identifier allocated by the source network device overlaps the first identifier allocated by the target network device.

With reference to the first possible implementation of the first aspect, in a third possible implementation of the first aspect, the data further includes a sequence number of the terminal device. If the target network device acknowledges, by using the identification information, that the terminal device has not been registered with the target network device includes: a sequence number corresponding to the source first identifier recorded in the target network device is different from the sequence number of the terminal device.

This also provides a technical solution to acknowledging that the terminal device has not been registered with the target network device. When the target network device records the source first identifier, the sequence number is used for further verification. This is especially applicable to a scenario in which the first identifier allocated by the source network device may overlap the first identifier allocated by the target network device. This avoids associating two different terminal devices, thereby further improving security.

With reference to the first possible implementation of the first aspect, in a fourth possible implementation of the first aspect, the data further includes an IP address of the terminal device. If the target network device acknowledges, by using the identification information, that the terminal device has not been registered with the target network device includes: an IP address corresponding to the source first identifier recorded in the target network device is different from the IP address of the terminal device. This also provides a technical solution to acknowledging that the terminal device has not been registered with the target network device. When the target network device records the source first identifier, the IP address is used for further verification. This is especially applicable to a scenario in which the first identifier allocated by the source network device may overlap the first identifier allocated by the target network device. This avoids associating two different terminal devices, thereby further improving security.

With reference to the first aspect, in a fifth possible implementation of the first aspect, the identification information of the terminal device is an initial first identifier of the terminal device, and the initial first identifier is a first identifier allocated to the terminal device by a network device to which the terminal device is attached. If the target network device acknowledges, by using the identification information, that the terminal device has not been registered with the target network device includes: the target network device has not recorded the initial first identifier.

In this implementation, after the terminal device moves to a coverage area of the target network device, the target network device acknowledges, by using the initial first identifier, that the terminal device has not been registered with the target network device. It can be acknowledged, based on that the target network device has not recorded the initial first identifier, that the terminal device has not been registered with the target network device. The acknowledging method is simple. This is especially applicable to a scenario in which the first identifier is allocated globally. In addition, the target network device does not need to reallocate a new first identifier to the terminal device, thereby simplifying a processing procedure of the target network device.

In the first to the fifth implementations, the data sent by the terminal device to the target base station may not need to carry an IP address, thereby saving an air interface resource.

With reference to the first aspect, in a sixth possible implementation of the first aspect, the identification information of the terminal device is an IP address of the terminal device. If the target network device acknowledges, by using the identification information, that the terminal device has not been registered with the target network device includes: the target network device has not recorded the IP address. This provides a technical solution to acknowledging that the terminal device has not been registered with the target network device. This is applicable to a case in which the data sent by the terminal device to the target base station does not carry the first identifier.

With reference to any one of the first aspect or the first to the sixth possible implementations of the first aspect, in a seventh possible implementation, that the target network device obtains user information of the terminal device includes: the target network device sends a user information request to a network controller, and the target network device receives a user information response sent by the network controller. The user information response includes the user information of the terminal device.

With reference to any one of the first aspect or the first to the sixth possible implementations of the first aspect, in an eighth possible implementation, that the target network device obtains user information of the terminal device includes: the target network device sends a user information request to the source network device, and the target network device receives a user information response sent by the source network device. The user information response includes the user information of the terminal device.

With reference to the first aspect or the first to the sixth possible implementations of the first aspect, in a ninth possible implementation, the target network device is a target network device-target user plane. That the target network device obtains user information of the terminal device includes: the target network device-target user plane sends a user information request to a target network device-control plane, and the target network device-target user plane receives a user information response sent by the target network device-control plane. The user information response includes the user information of the terminal device.

With reference to the first aspect or the first to the sixth possible implementations of the first aspect, in a tenth possible implementation, the target network device is a target network device-target user plane. That the target network device obtains user information of the terminal device includes: the target network device-target user plane sends a user information request to a source network device-source user plane, and the target network device-target user plane receives a user information response sent by the source network device-source user plane. The user information response includes the user information of the terminal device.

The seventh to the tenth implementations provide specific solutions to obtaining the user information by the target network device in different cases.

With reference to any one of the first aspect or the first to the tenth possible implementations of the first aspect, in an eleventh possible implementation, that the data is sent by a terminal device to the target base station includes: the data is sent by the terminal device to the target base station through grant-free transmission.

According to a second aspect, an embodiment of the present invention provides a data transmission method. In the transmission method, a terminal device sends data to a target base station, so that the target base station sends the data to a target network device. The data includes a source first identifier of the terminal device. The source first identifier is a first identifier allocated by a source network device to the terminal device. When the target network device acknowledges, by using the source first identifier, that the terminal device has not been registered with the target network device but the target network device obtains user information, the terminal device receives a new first identifier from the target base station. The new first identifier is allocated by the target network device to the terminal device.

According to a third aspect, an embodiment of the present invention provides a data transmission method. In the transmission method, a target base station receives data sent by a terminal device. The data includes a source first identifier of the terminal device, and the source first identifier is a first identifier allocated by a source network device to the terminal device. The target base station sends the data to a target network device. When the target network device acknowledges, by using the source first identifier, that the terminal device has not been registered with the target network device but the target network device obtains user information, the target base station receives a new first identifier from the target network device. The new first identifier is allocated by the target network device to the terminal device. The target base station sends the new first identifier to the terminal device.

In the second aspect and the third aspect, when the terminal device moves to coverage areas of the target base station and the target network device, the terminal device sends the data to the target base station, and the target base station sends the data to the target network device. When the target network device acknowledges, based on the source first identifier of the terminal device in the data, that the terminal device has not been registered with the target network device but the target network device obtains the user information of the terminal device, the terminal device receives the new first identifier from the target base station. In this way, the terminal device can use the new first identifier in subsequent data transmission. In a scenario in which the terminal device moves, data transmission can also be performed properly. When the target network device acknowledges, by using the source first identifier, that the terminal device has not been registered with the target network device but the target network device obtains the user information of the terminal device, the terminal device receives the new first identifier from the target base station. This can verify whether the terminal device is an authorized user. This ensures secure data transmission of an authorized user, and avoids performing data transmission for an unauthorized user.

According to a fourth aspect, an embodiment of the present invention provides a communication processing method. In the processing method, when a terminal device has not been registered with a target network device-target user plane, a target network device-control plane receives a user information request from the target network device-target user plane. The target network device-control plane sends a user information response to the target network device-target user plane. The user information response includes user information of the terminal device.

With reference to the fourth aspect, in a first possible implementation of the fourth aspect, after the target network device-control plane sends the user information response to the target network device-target user plane, the method further includes: sending, by the target network device-control plane, a first identifier allocation command to the target network device-target user plane; and receiving, by the target network device-control plane, a first identifier allocation response sent by the target network device-target user plane. The first identifier allocation response includes a new first identifier of the terminal device.

With reference to the fourth aspect or the first possible implementation of the fourth aspect, in a second possible implementation of the fourth aspect, after the target network device-control plane sends the user information response to the target network device-target user plane, the method further includes: sending, by the target network device-control plane, a downlink transmission target update request to a gateway, to request to change, to the target network device-target user plane, a target to which the gateway sends downlink data; and receiving, by the target network device-control plane, a downlink transmission target update response sent by the gateway. The downlink transmission target update response is used to indicate that the gateway has changed the downlink data transmission target of the terminal device to the target network device-target user plane.

According to a fifth aspect, an embodiment of the present invention provides a network device. The network device includes a transceiver; a memory, configured to store an instruction; and a processor separately connected to the memory and the transceiver. The processor is configured to execute the instruction, to perform the following steps when executing the instruction: receiving, by using the transceiver, data sent by a target base station, where the data is sent by a terminal device to the target base station, and the data includes identification information of the terminal device; if it is acknowledged, by using the identification information, that the terminal device has not been registered with the network device, obtaining user information of the terminal device by using the transceiver; and after obtaining the user information of the terminal device, sending the data to a gateway by using the transceiver.

With reference to the fifth aspect, in a first possible implementation of the fifth aspect, the identification information of the terminal device is a source first identifier of the terminal device, and the source first identifier is allocated by a source network device to the terminal device. The processor further performs the following steps when executing the instruction: after obtaining the user information of the terminal device, allocating a new first identifier to the terminal device, and sending, by using the transceiver, the new first identifier to the terminal device by using the target base station.

With reference to the first possible implementation of the fifth aspect, in a second possible implementation of the fifth aspect, the memory is further configured to store information. The case in which the terminal device has not been registered with the network device includes: the information stored in the memory does not include the source first identifier.

With reference to the first possible implementation of the fifth aspect, in a third possible implementation of the fifth aspect, the data further includes a sequence number of the terminal device. The memory is further configured to store information. The case in which the terminal device has not been registered with the network device includes: a sequence number corresponding to the source first identifier in the information stored in the memory is different from the sequence number of the terminal device.

With reference to the first possible implementation of the fifth aspect, in a fourth possible implementation of the fifth aspect, the data further includes an IP address of the terminal device. The memory is further configured to store information. The case in which the terminal device has not been registered with the network device includes: an IP address corresponding to the source first identifier in the information stored in the memory is different from the IP address of the terminal device.

With reference to the fifth aspect, in a fifth possible implementation of the fifth aspect, the identification information of the terminal device is an initial first identifier of the terminal device, and the initial first identifier is a first identifier allocated to the terminal device by a network device to which the terminal device is attached. The memory is further configured to store information. The case in which the terminal device has not been registered with the network device includes: the information stored in the memory does not include the initial first identifier.

With reference to the fifth aspect, in a sixth possible implementation of the fifth aspect, the identification information of the terminal device is an IP address of the terminal device. The memory is further configured to store information. The case in which the terminal device has not been registered with the network device includes: the information stored in the memory does not include the IP address.

With reference to any one of the fifth aspect or the first to the sixth possible implementations of the fifth aspect, in a seventh possible implementation of the fifth aspect, that the processor performs the step of obtaining user information of the terminal device by using the transceiver includes: the processor sends a user information request to a network controller by using the transceiver; and the processor receives, by using the transceiver, a user information response sent by the network controller. The user information response includes the user information of the terminal device.

With reference to any one of the fifth aspect or the first to the sixth possible implementations of the fifth aspect, in an eighth possible implementation of the fifth aspect, that the processor performs the step of obtaining user information of the terminal device by using the transceiver includes: the processor sends a user information request to the source network device by using the transceiver; and the processor receives, by using the transceiver, a user information response sent by the source network device. The user information response includes the user information of the terminal device.

With reference to any one of the fifth aspect or the first to the sixth possible implementations of the fifth aspect, in a ninth possible implementation of the fifth aspect, that the processor performs the step of obtaining user information of the terminal device by using the transceiver includes: the processor sends a user information request to a target network device-control plane by using the transceiver; and the processor receives, by using the transceiver, a user information response sent by the target network device-control plane. The user information response includes the user information of the terminal device.

With reference to any one of the fifth aspect or the first to the sixth possible implementations of the fifth aspect, in a tenth possible implementation of the fifth aspect, that the processor performs the step of obtaining user information of the terminal device by using the transceiver includes: the processor sends a user information request to a source network device-source user plane by using the transceiver; and the processor receives, by using the transceiver, a user information response sent by the source network device-source user plane. The user information response includes the user information of the terminal device.

According to a sixth aspect, an embodiment of the present invention provides a terminal device. The terminal device includes a transceiver; a memory, configured to store an instruction; and a processor separately connected to the memory and the transceiver. The processor is configured to execute the instruction, to perform the following steps when executing the instruction: sending data to a target base station by using the transceiver, so that the target base station sends the data to a target network device, where the data includes a source first identifier of the terminal device, and the source first identifier is a first identifier allocated by a source network device to the terminal device; and when the target network device acknowledges, by using the source first identifier, that the terminal device has not been registered with the target network device but the target network device obtains user information, receiving a new first identifier from the target base station by using the transceiver, where the new first identifier is allocated by the target network device to the terminal device.

According to a seventh aspect, an embodiment of the present invention provides a base station. The base station includes a transceiver; a memory, configured to store an instruction; and a processor separately connected to the memory and the transceiver. The processor is configured to execute the instruction, to perform the following steps when executing the instruction: receiving, by using the transceiver, data sent by a terminal device, where the data includes a source first identifier of the terminal device, and the source first identifier is a first identifier allocated by a source network device to the terminal device; sending the data to a target network device by using the transceiver; when the target network device acknowledges, by using the source first identifier, that the terminal device has not been registered with the target network device but the target network device obtains user information, receiving a new first identifier from the target network device by using the transceiver, where the new first identifier is allocated by the target network device to the terminal device; and sending the new first identifier to the terminal device by using the transceiver.

According to an eighth aspect, an embodiment of the present invention provides a network device. The network device includes a transceiver; a memory, configured to store an instruction; and a processor separately connected to the memory and the transceiver. The processor is configured to execute the instruction, to perform the following steps when executing the instruction: when a terminal device has not been registered with a target network device-target user plane, receiving, by the processor, a user information request from the target network device-target user plane by using the transceiver; and sending a user information response to the target network device-target user plane by using the transceiver, where the user information response includes user information of the terminal device.

With reference to the eighth aspect, in a first possible implementation of the eighth aspect, the processor further performs the following steps when executing the instruction: sending a first identifier allocation command to the target network device-target user plane by using the transceiver; and receiving, by using the transceiver, a first identifier allocation response sent by the target network device-target user plane, where the first identifier allocation response includes a new first identifier of the terminal device.

With reference to the eighth aspect or the first possible implementation of the eighth aspect, in a second possible implementation of the eighth aspect, the processor further performs the following steps when executing the instruction: sending a downlink transmission target update request to a gateway by using the transceiver, to request to change, to the target network device-target user plane, a target to which the gateway sends downlink data; and receiving, by using the transceiver, a downlink transmission target update response sent by the gateway, where the downlink transmission target update response is used to indicate that the gateway has changed the downlink data transmission target of the terminal device to the target network device-target user plane.

According to a ninth aspect, an embodiment of the present invention provides a network system. The network system includes the network device in the fifth aspect and the base station in the seventh aspect, or the network system includes the base station in the seventh aspect and the network device in the eighth aspect.

According to a tenth aspect, an embodiment of the present invention provides a network device. The network device includes a receiving unit, a processing unit, and a sending unit. The receiving unit is configured to receive data sent by a target base station. The data is sent by a terminal device to the target base station, and the data includes identification information of the terminal device. The processing unit is configured to: if it is acknowledged, by using the identification information, that the terminal device has not been registered with the target network device, obtain user information of the terminal device by using the sending unit and the receiving unit. The sending unit is configured to: when the processing unit obtains the user information of the terminal device, send the data to a gateway by the target network device.

With reference to the tenth aspect, in a first possible implementation of the tenth aspect, the identification information of the terminal device is a source first identifier of the terminal device, and the source first identifier is a first identifier allocated by a source network device to the terminal device. The processing unit is further configured to: after the target network device obtains the user information of the terminal device, allocate a new first identifier to the terminal device, and send, by the target network device, the new first identifier to the terminal device by using the target base station.

With reference to the first possible implementation of the tenth aspect, in a second possible implementation of the tenth aspect, the network device further includes a memory. The case in which the terminal device has not been registered with the target network device includes: the memory has not stored the source first identifier.

With reference to the first possible implementation of the tenth aspect, in a third possible implementation of the tenth aspect, the data further includes a sequence number of the terminal device. The network device further includes a memory. The case in which the terminal device has not been registered with the target network device includes: a sequence number corresponding to the source first identifier stored in the memory is different from the sequence number of the terminal device.

With reference to the first possible implementation of the tenth aspect, in a fourth possible implementation of the tenth aspect, the data further includes an IP address of the terminal device. The network device further includes a memory. The case in which the terminal device has not been registered with the target network device includes: an IP address corresponding to the source first identifier stored in the memory is different from the IP address of the terminal device.

With reference to the tenth aspect, in a fifth possible implementation of the tenth aspect, the identification information of the terminal device is an initial first identifier of the terminal device, and the initial first identifier is a first identifier allocated to the terminal device by a network device to which the terminal device is attached. The network device further includes a memory. The case in which the terminal device has not been registered with the target network device includes: the memory has not stored the initial first identifier.

With reference to the tenth aspect, in a sixth possible implementation of the tenth aspect, the identification information of the terminal device is an IP address of the terminal device. The network device further includes a memory. The case in which the terminal device has not been registered with the target network device includes: the memory has not stored the IP address.

With reference to any one of the tenth aspect or the first to the sixth possible implementations of the tenth aspect, in a seventh possible implementation of the tenth aspect, that the processing unit obtains user information of the terminal device by using the sending unit and the receiving unit includes: the processing unit sends a user information request to a network controller by using the sending unit; and the processing unit receives, by using the receiving unit, a user information response sent by the network controller. The user information response includes the user information of the terminal device.

With reference to the tenth aspect or the first to the sixth possible implementations of the tenth aspect, in an eighth possible implementation, that the processing unit obtains user information of the terminal device by using the sending unit and the receiving unit includes: the processing unit sends a user information request to the source network device by using the sending unit; and the processing unit receives, by using the receiving unit, a user information response sent by the source network device. The user information response includes the user information of the terminal device.

With reference to the tenth aspect or the first to the sixth possible implementations of the tenth aspect, in a ninth possible implementation, the network device is a network device-target user plane. That the processing unit obtains user information of the terminal device by using the sending unit and the receiving unit includes: the processing unit sends a user information request to a target network device-control plane by using the sending unit; and the processing unit receives, by using the receiving unit, a user information response sent by the target network device-control plane. The user information response includes the user information of the terminal device.

With reference to the tenth aspect or the first to the sixth possible implementations of the tenth aspect, in a tenth possible implementation, the network device is a network device-target user plane. That the processing unit obtains user information of the terminal device by using the sending unit and the receiving unit includes: the processing unit sends a user information request to a source network device-source user plane by using the sending unit; and the processing unit receives, by using the receiving unit, a user information response sent by the source network device-source user plane. The user information response includes the user information of the terminal device.

With reference to any one of the tenth aspect or the first to the tenth possible implementations of the tenth aspect, in an eleventh possible implementation, that the data is sent by a terminal device to the target base station includes: the data is sent by the terminal device to the target base station through grant-free transmission.

According to an eleventh aspect, an embodiment of the present invention provides a terminal device. The terminal device includes a sending unit and a receiving unit. The sending unit is configured to send data to a target base station, so that the target base station sends the data to a target network device. The data includes a source first identifier of the terminal device, and the source first identifier is a first identifier allocated by a source network device to the terminal device. The receiving unit is configured to: when the target network device acknowledges, by using the source first identifier, that the terminal device has not been registered with the target network device but the target network device obtains user information, receive a new first identifier from the target base station. The new first identifier is allocated by the target network device to the terminal device.

According to a twelfth aspect, an embodiment of the present invention provides a base station. The base station includes a sending unit and a receiving unit. The receiving unit is configured to receive data sent by a terminal device. The data includes a source first identifier of the terminal device, and the source first identifier is a first identifier allocated by a source network device to the terminal device. The sending unit is configured to send the data to a target network device. The receiving unit is further configured to: when the target network device acknowledges, by using the source first identifier, that the terminal device has not been registered with the target network device but the target network device obtains user information, receive a new first identifier from the target network device. The new first identifier is allocated by the target network device to the terminal device. The sending unit is further configured to send the new first identifier to the terminal device.

According to a thirteenth aspect, an embodiment of the present invention provides a network device. The network device includes a sending unit and a receiving unit. The receiving unit is configured to: when a terminal device has not been registered with a target network device-target user plane, receive a user information request from the target network device-target user plane. The sending unit is configured to send a user information response to the target network device-target user plane. The user information response includes user information of the terminal device.

With reference to the thirteenth aspect, in a first possible implementation of the thirteenth aspect, the sending unit is further configured to: after sending the user information response to the target network device-target user plane, send a first identifier allocation command to the target network device-target user plane. The receiving unit is further configured to receive a first identifier allocation response sent by the target network device-target user plane. The first identifier allocation response includes a new first identifier of the terminal device.

With reference to the thirteenth aspect or the first possible implementation of the thirteenth aspect, in a second possible implementation of the thirteenth aspect, the sending unit is further configured to: after sending the user information response to the target network device-target user plane, send a downlink transmission target update request to a gateway, to request to change, to the target network device-target user plane, a target to which the gateway sends downlink data. The receiving unit is further configured to receive a downlink transmission target update response sent by the gateway. The downlink transmission target update response is used to indicate that the gateway has changed the downlink data transmission target of the terminal device to the target network device-target user plane.

According to a fourteenth aspect, an embodiment of the present invention provides a network system. The network system includes the network device in the tenth aspect and the base station in the twelfth aspect, or the network system includes the base station in the twelfth aspect and the network device in the thirteenth aspect.

According to the data transmission method, the communication processing method, the network device, the terminal device, and the base station provided in the embodiments of the present invention, the terminal device can still properly perform data transmission during movement.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of this patent application, and a person of ordinary skill in the art may derive other drawings from these accompanying drawings without creative efforts.

DESCRIPTION OF EMBODIMENTS

Figure 1:
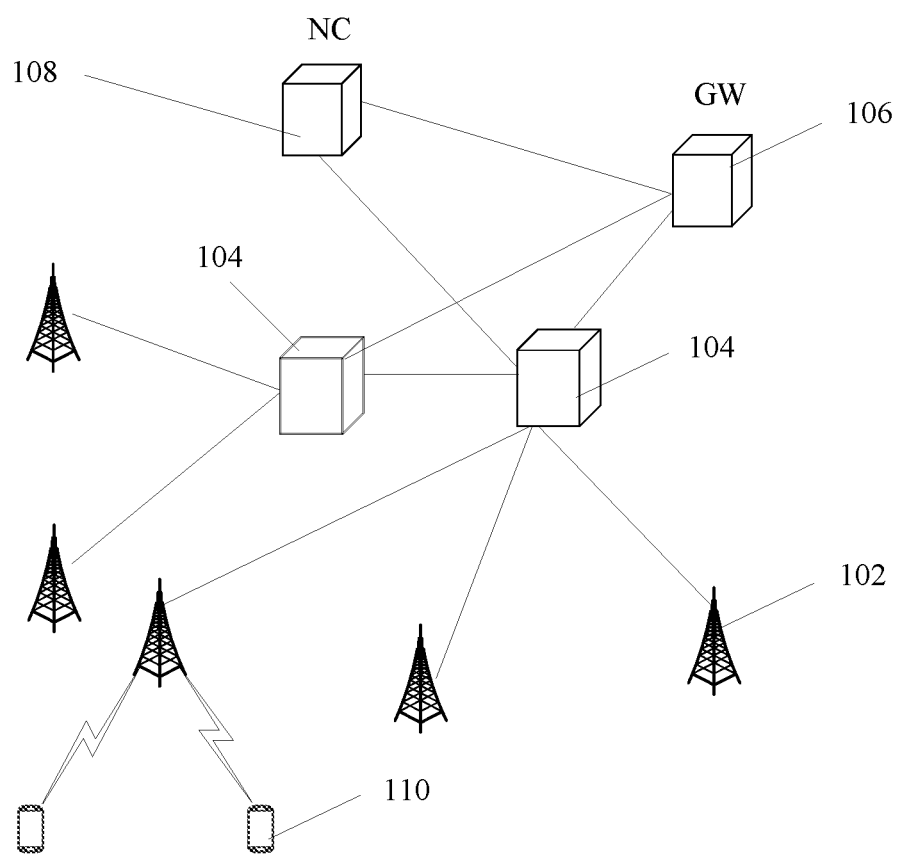
FIG. 1 is a schematic architectural diagram of a network system according to an embodiment of this patent application.

The following clearly describes the technical solutions in the embodiments of the present invention with reference to the accompanying drawings in the embodiments of the present invention. Apparently, the described embodiments are some rather than all of the embodiments of this patent application. All other embodiments obtained by an ordinary skilled people in the art based on the embodiments of this patent application without creative efforts shall fall within the protection scope of this patent application.

In this patent application, the term "first" is merely used to differentiate between similar objects, and "first" specifically indicates an object or a type of object, but is not necessarily used to describe a specific order or sequence. It should be understood that the terms used in such a way are interchangeable in proper circumstances, which is merely a discrimination manner that is used when objects having a same attribute are described in the embodiments of this patent application. "A" or "one" does not exclude a case of "a plurality of". In addition, the terms "include", "contain", and any other variants mean to cover the non-exclusive inclusion, so that a process, method, system, product, or device that includes a series of units is not necessarily limited to those units, but may include other units not expressly listed or inherent to such a process, method, system, product, or device.

A terminal device in this patent application may include a handheld device, an in-vehicle device, a wearable device, or a computing device that has a radio communication function, another processing device connected to a wireless modem, user equipment (User Equipment, UE) in various forms, or a mobile station (Mobile Station, MS for short). The terminal device may be a machine type communication device, and may include a sensor or the like. For ease of description, in this patent application, the devices mentioned above are collectively referred to as a terminal device or UE.

A base station (Base Station, BS) in this patent application is an apparatus that is deployed in a radio access network and that provides a wireless communication function for UE. The base station may include various forms of macro base stations, micro base stations, relay stations, access points, and the like. In systems in which different radio access technologies are used, a device having a base station function may have different names. For example, the device is referred to as an evolved NodeB (evolved NodeB, eNB or eNodeB for short) in an LTE network; the device is referred to as a NodeB (NodeB) in a 3rd Generation 3G network, and the like. The device may have a different name in a future network. For ease of description, in this patent application, the apparatuses providing the wireless communication function for the UE are collectively referred to as a base station.

A network device is a network-side communications device that performs data transmission with a base station. The network device may also process data.

In this patent application, a gateway may include a service gateway (Serving Gateway, S-GW), a packet data network gateway (Packet Data Network GateWay, P-GW), or a network node having a gateway function.

Grant-free transmission may be understood as any one or more of the following meanings, a combination of some technical features in a plurality of meanings, or another similar meaning.

Grant-free transmission may be a method for implementing uplink data transmission by a terminal device in a public land mobile network (Public Land Mobile Network, PLMN) without a need to perform dynamic scheduling by a network device or by a radio controller in a cloud/centralized radio access network (Cloud/Centralized Radio Access Network, CRAN) scenario. Dynamic scheduling means that each uplink transmission performed by UE after the transmission time interval (Transmission Time Interval, TTI) in which network assigns the transmission resource by signaling. The transmission time interval is a minimum time unit for one uplink transmission, such as 1 ms.

Grant-free transmission may be a mode in which a terminal device performs data transmission on a specified time-frequency resource based on different characteristics of to-be-transmitted data, such as requirement on transmission latency or reliability, by using a code resource, a pilot resource, a modulation and coding scheme, a feedback class, a diversity mode, and the like that are supported by the time-frequency resource, to reduce network signaling and/or reduce a transmission latency.

Grant-free transmission may mean the following: A plurality of transmission resources are pre-allocated and the terminal device is notified about the pre-allocated plurality of transmission resources. When having an uplink data transmission requirement, the terminal device selects at least one piece of transmission resource from the plurality of transmission resources pre-allocated by the network device, and sends uplink data by using the selected transmission resource. The network device detects, on the transmission resource of the pre-allocated plurality of transmission resources, the uplink data sent by the terminal device. Detection may be blind detection, may be performed based on a control field in the uplink data, or may be performed in some other manner.

Grant-free transmission may mean the following: A plurality of transmission resources are pre-allocated and terminal device are notified about the pre-allocated plurality of transmission resources, so that when having an uplink data transmission requirement, the terminal device selects at least one piece of transmission resource from the plurality of transmission resources pre-allocated by the network device, and sends uplink data by using the selected transmission resource.

Grant-free transmission may mean the following: Information about pre-allocated a plurality of transmission resources is obtained; and when there is an uplink data transmission requirement, at least one piece of transmission resource is selected from the pre-allocated plurality of transmission resources, and uplink data is sent by using the selected transmission resource. The information may be obtained from a network device.

Grant-free transmission may be a method for performing uplink data transmission by a terminal device without dynamic scheduling performed by a network device. Dynamic scheduling may be a scheduling manner in which the network device indicates, by using signaling, a transmission resource for each uplink data transmission of the terminal device. Optionally, implementing uplink data transmission of the terminal device may be understood as follows: At least two terminal devices are allowed to transmit uplink data on a same time-frequency resource. Optionally, the transmission resource may be a transmission resource in a transmission time unit following a moment at which UE receives signaling. A transmission time unit may be a minimum time unit for one transmission, for example, a TTI (Transmission Time Interval) whose value may be 1 ms, or may be a preset transmission time unit.

Grant-free transmission may mean the following: A terminal device transmits uplink data without a grant assigned by a network device. The grant may mean the following: The terminal device sends an uplink scheduling request to the network device; and after receiving the scheduling request, the network device sends an uplink grant to the terminal device. The uplink grant indicates an uplink transmission resource allocated to the terminal device.

Grant-free transmission may be a contention-based transmission mode. Specifically, the contention-based transmission mode may mean that a plurality of terminal devices simultaneously transmit uplink data on a same pre-allocated time-frequency resource without a grant from a base station.

Blind detection may be understood as performing data detection when it is unknown in advance whether data arrives or not. Blind detection may alternatively be understood as detection performed without an explicit signaling indication.

An air interface resource is a resource used by a terminal device for performing transmission through an air interface. A transmission resource may include but is not limited to one of or a combination of more of the following resources:
- a time domain resource, such as a radio frame, a subframe, and a symbol;
- a frequency domain resource, such as a subcarrier and a resource block;
- a space domain resource, such as a transmit antenna and a beam;
- a code domain resource, such as a sparse code multiple access (Sparse Code Multiple Access, "SCMA") codebook, a low density signature (Low Density Signature, "LDS") sequence, and a CDMA code; and
- an uplink pilot resource.

The foregoing transmission resources may be used for transmission performed according to control mechanisms including but not limited to the following:
- uplink power control, such as control of an upper limit of uplink transmit power;
- modulation and coding scheme setting, such as setting of a transport block size, a bit rate, or a modulation order; and
- a retransmission mechanism, such as a HARQ mechanism.

A network device may be further a communications device that receives grant-free transmission data from a base station or sent to a base station, and processes the grant-free transmission data. A contention transmission unit (Contention Transmission Unit, "CTU") may be a basic transmission resource used for grant-free transmission. The CTU may be a transmission resource combining time, frequency, and code domain resources, may be a transmission resource combining time, frequency, and pilot resources, or may be a transmission resource combining time, frequency, and code domain resources, and a pilot resource.

An access area of the CTU may be a time-frequency area used for grant-free transmission, and may be further a time-frequency area corresponding to the CTU.

Names of network entities in all the embodiments of this patent may be extended to names having a same function or similar functions.

In this patent application, steps are numbered in method description. However, this does not mean that the steps need to be performed in a number sequence. A person skilled in the art may adjust a sequence of the steps without creative efforts.

The patent application No. PCT/CN2014/073084 and entitled "System and Method for Uplink Grant-Free Transmission Scheme" (System and Method for Uplink Grant-free Transmission Scheme) provides a technical solution for uplink grant-free transmission. In this patent application, a radio resource is divided into contention transmission units (Contention Transmission Unit, CTU) of various sizes, and a terminal device is mapped to a CTU. One group of codes are allocated to each CTU. The allocated code may be a Code Division Multiple Access (Code Division Multiple Access, CDMA) code, a sparse code multiple access (Sparse Code Multiple Access, SCMA) code, a low density signature (Low Density Signature, LDS), a signature (signature), or the like. Each code is corresponding to one group of pilots. The terminal device may select one code and one pilot in a pilot group corresponding to the code, to perform uplink transmission.

Content of the patent application No. PCT/CN2014/073084 may be understood as a part incorporated into content of the embodiments of the present invention by reference, and details are not described. The patent application No. PCT/CN2014/073084 mainly focuses on air interface transmission, and does not describe processing on a network side.

Chinese Patent Application No. 201510859746.2 and entitled with "Data Transmission Method and System" provides a technical solution for data transmission. This patent application provides a solution for a network side. However, for a case in which a terminal device moves, the patent application No. 201510859746.2 does not provide a corresponding solution. Content of the patent application No. 201510859746.2 may be understood as a part incorporated into content of the embodiments of the present invention by reference, and details are not described.

An architecture in the embodiments of the present invention is first described below. FIG. 1 is a schematic architectural diagram of a network system according to an embodiment of this patent application. As shown in FIG. 1, the network system includes a network device 104, a gateway (GateWay, GW) 106, a network controller (Network Controller, NC) 108, and a plurality of base stations (Evolved NodeB, eNB) 102. Each base station 102 manages a large quantity of terminal devices 110 served by the base station 102. In this embodiment, the network device 104 has a centralized architecture, and may be responsible for both processing on a control plane and processing on a user plane. There may be a plurality of network devices 104 in the network system. There is one or more first bearers pre-established between the network device 104 and each base station 102, and there is one or more second bearers pre-established between the network device 104 and the gateway 106.

The network device 104 may be connected to the plurality of base stations 102, and serve the terminal devices 110 served by the plurality of base stations 102. The network device 104 may be further connected to the network controller 108, and the network device may obtain user information of the terminal devices 110 from the network controller 108. The network controller 108 may include a mobility management entity (Mobility Management Entity, MME), a policy and charging rules function (Policy Charging and Rule Function, PCRF), or a home subscriber server (Home Subscriber Server, HSS).

The network device 104 may be further connected to the gateway 106. The network device 104 has a unique identifier for identifying an identity of the network device 104, and the identifier may be an IP address of the network device.

A network in this embodiment of the present invention may be a public land mobile network (Public Land Mobile Network, "PLMN"), a device-to-device (Device to Device, "D2D") network, an M2M network, or another network. FIG. 1 is merely a simplified schematic diagram of an example. The network may further include another network device that is not shown in FIG. 1.

The network device 104 may be a physical entity or a functional entity. When the network device 104 is a functional entity, the network device 104 may be physically deployed together with the network controller, the GW, or another network device.

The first bearer and the second bearer are pre-established, and are not released after a single data transmission completed. After a single data transmission completed, the first bearer and the second bearer continue to be retained for use in next data transmission. The first bearer and the second bearer do not need to be continually created or deleted with a status change of the terminal device or after a single data transmission completed. Quantities of the first bearer and the second bearer are determined based on a service attribute of to-be-transmitted data. The quantities of the first bearer and the second bearer each do not need to be corresponding to a quantity of terminal devices.

During attachment of the terminal device, the gateway may allocate an IP address to the terminal device. Optionally, during attachment of the terminal device, the network device also allocates a first identifier to the terminal device, and there is a correspondence between the first identifier and the IP address. The correspondence may be stored in the network device. A quantity of bits of the first identifier may be less than a quantity of bits of the IP address. When performing data transmission with the base station, the terminal device only needs to use the first identifier, thereby saving air interface resources. A first identifier allocated by a network device to which the terminal device is attached is referred to as an initial first identifier. The network device to which the terminal device attached is a network device that the terminal device accesses during attachment.

Figure 2:
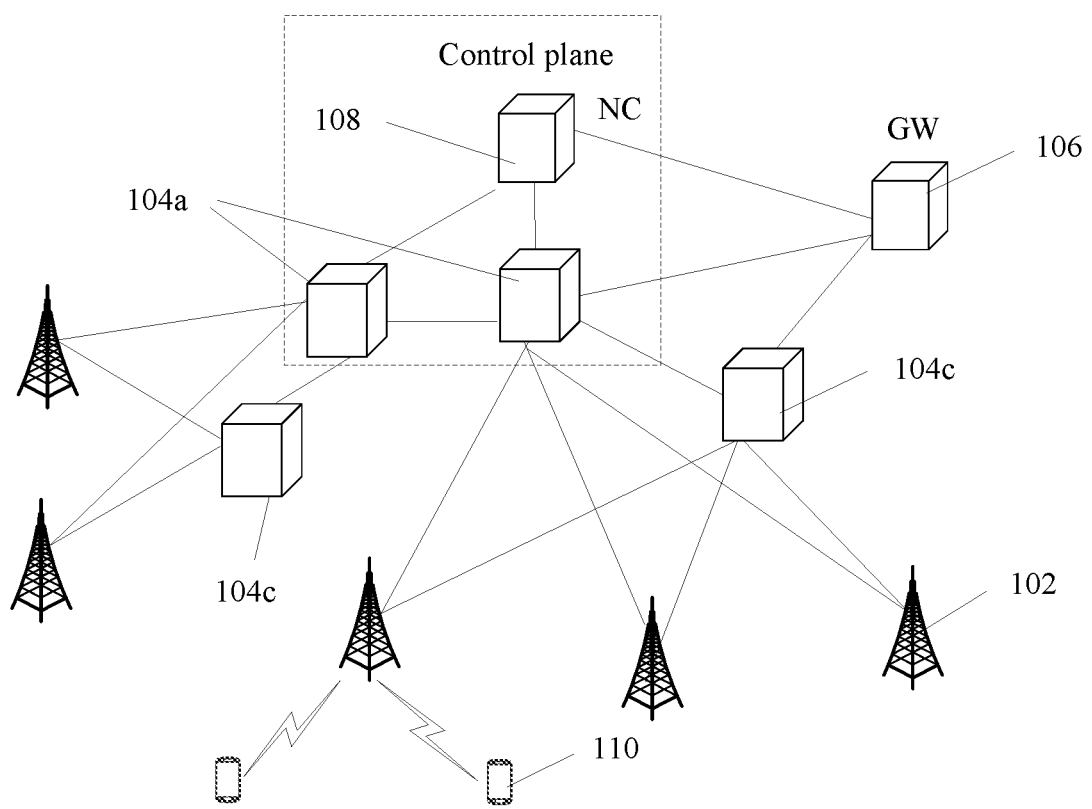
FIG. 2 is a schematic architectural diagram of a network system according to another embodiment of this patent application.

FIG. 2 is a schematic architectural diagram of a network system according to another embodiment of this patent application. In this embodiment, the network system adopts an architecture in which a control plane and a user plane (Control Plane/User Plane, "C/U") are separated. The control plane performs control in a centralized manner, and the user plane completes data forwarding. As shown in FIG. 2, the network system includes a network device, a gateway 106, a network controller 108, and a plurality of base stations 102. The network device has a separated architecture, and includes a network device-control plane 104a and a network device-user plane 104c.

The network device-control plane 104a and the network device-user plane 104c each may be connected to a plurality of base stations. In the separated architecture of the network device, one network device-control plane may be connected to a plurality of network device-user planes. A plurality of services can be supported in one network device-user planes, or a types of service is supported by a network device-user plane. For example, one network device-user plane supports a low-latency high-reliability service, and another network device-user plane supports a latency-tolerant reliable transmission service.

When moving in a network, the terminal device is likely to be out of a coverage area of a source network device. The terminal device may move between coverage areas of different network devices or different network device-user planes. How to ensure mobility of the terminal device becomes a problem that needs to be resolved.

The architecture of the network system that may be applied to this patent application is described above merely by using an example. This constitutes no limitation on an application scope of this patent application. It should be noted that, this patent application may also be applied to another network system.

In this patent application, when a terminal device moves from a coverage area of a source network device to a coverage area of a target network device, if the terminal device has data that needs to be transmitted, the terminal device transmits the data to a target base station, and the target base station directly sends the data to the target network device. The data includes identification information of the terminal device. When the target network device acknowledges, by using identification information, that the terminal device has not been registered with the target network device, the target network device obtains user information of the terminal device. In this way, the terminal device can perform data transmission properly. Optionally, the terminal device performs data transmission through grant-free transmission instead of performing random access first.

Figure 3A:
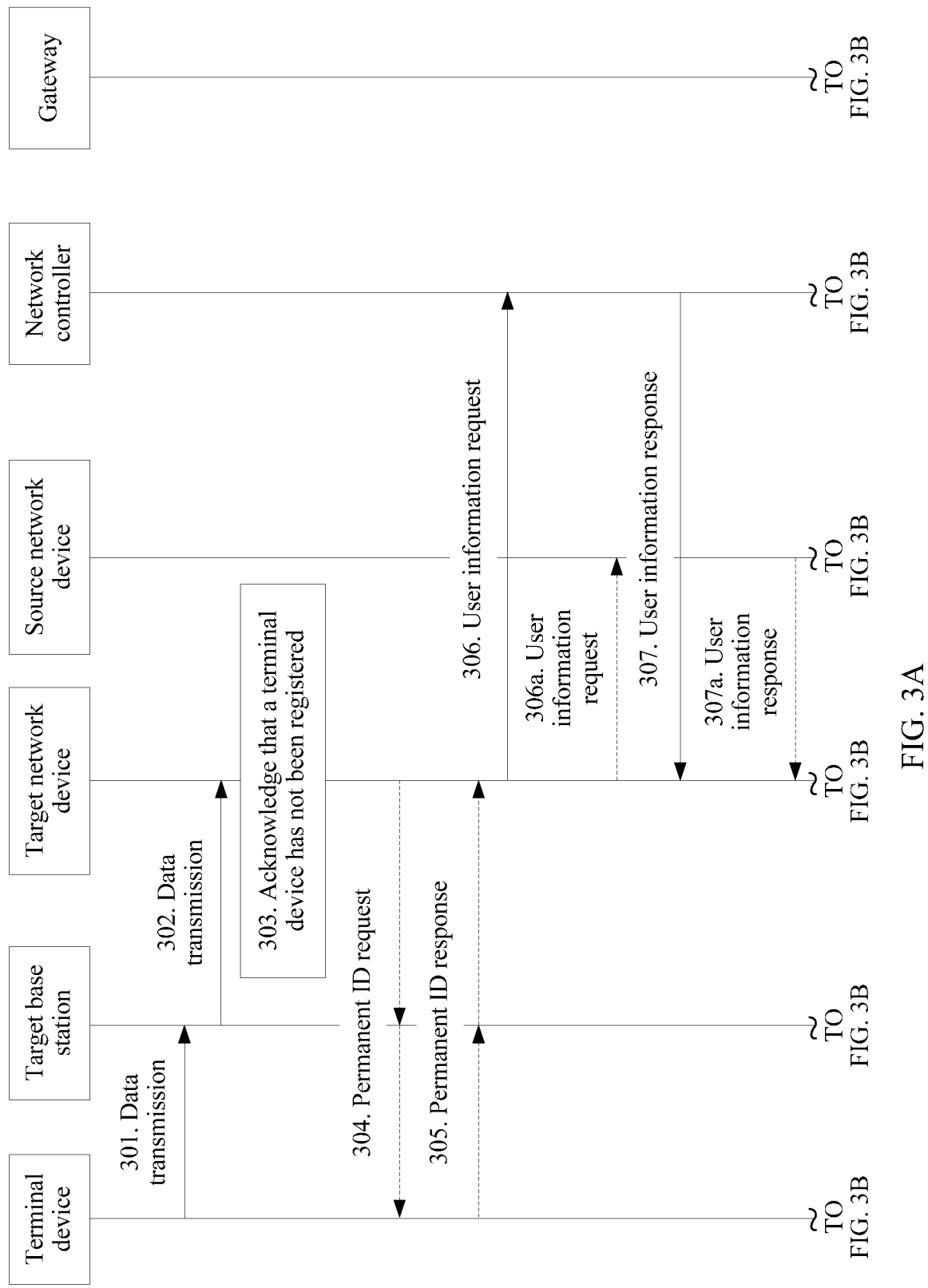
FIG. 3A and FIG. 3B are a schematic interaction diagram of a data transmission method according to another embodiment of this patent application.
Figure 3B:
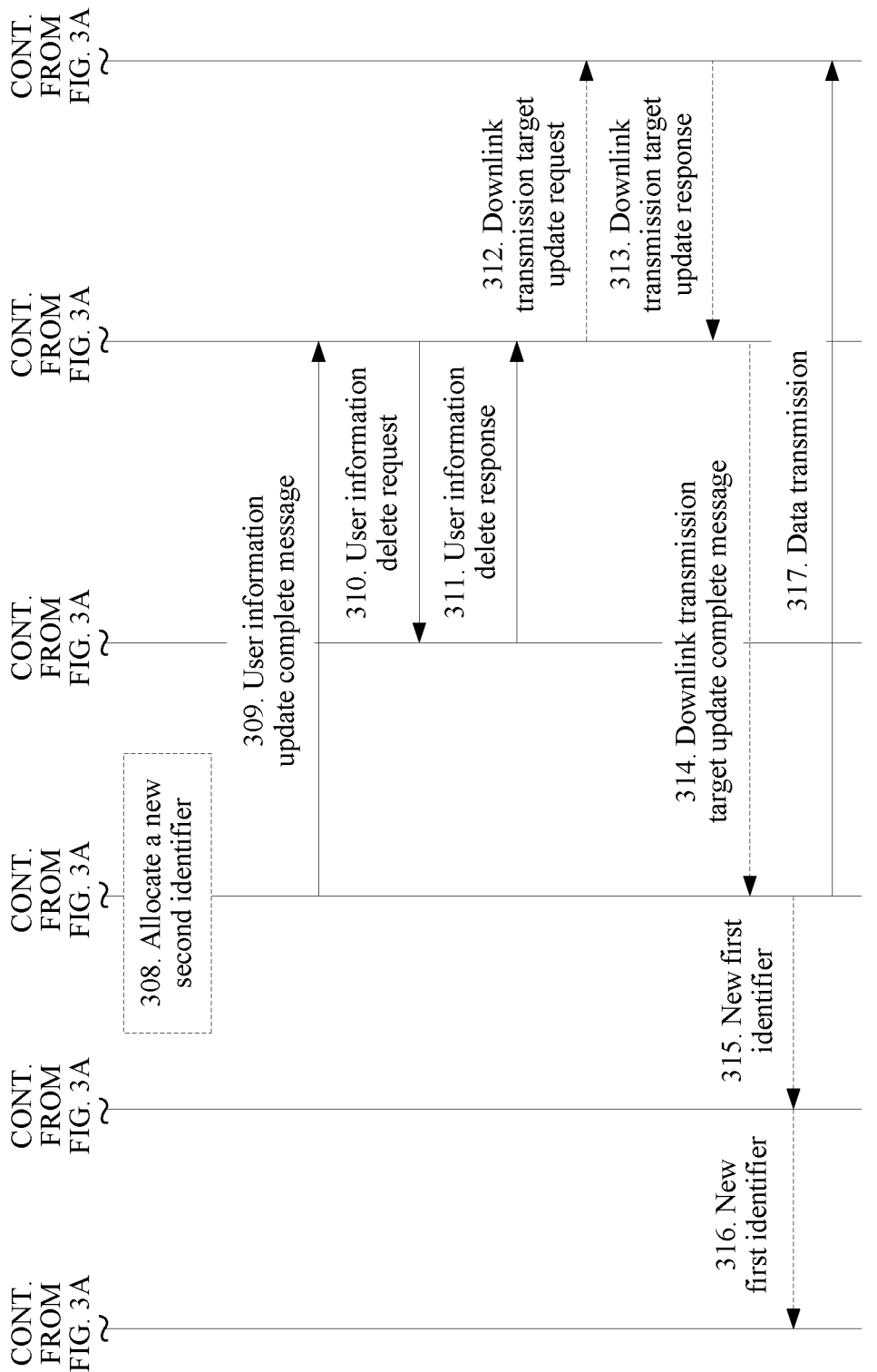

FIG. 3A and FIG. 3B are a schematic diagram of a data transmission method according to an embodiment of this patent application. This embodiment may be applied to the network system shown in FIG. 1. It should be noted that, this method may also be applied to another network system. As shown in FIG. 3A and FIG. 3B, the method includes the following steps.

301. After a terminal device moves to coverage areas of a target base station and a target network device, when the terminal device has data that needs to be transmitted, the terminal device sends the data to the target base station by using an air interface resource, and the target base station receives, on the air interface resource, the data sent by the terminal device. The data includes identification information of the terminal device. The data may further include identification information of the target base station, for example, an IP address of the target base station or ID information of the target base station. In step 301, the identification information of the terminal device may be a source first identifier of the terminal device, and the source first identifier is a first identifier allocated by a source network device to the terminal device. In this case, each network device allocates a first identifier independently, and there is a possibility that the first identifiers allocated by different network devices overlapped. Alternatively, the identification information of the terminal device may be an IP address of the terminal device. Alternatively, the identification information of the terminal device may be an initial first identifier of the terminal device, and the initial first identifier is a first identifier allocated by a network device to which the terminal device is attached. In this case, if the first identifier is allocated globally, the first identifier is unique in a network system.

302. The target base station sends the data to the target network device by using a first bearer, and the target network device receives the data sent by the target base station.

303. The target network device acknowledges, by using the identification information, whether the terminal device has been registered with the target network device, and if acknowledging that the terminal device has not been registered with the target network device, the target network device proceeds to perform the following steps. Optionally, the target network device may perform information matching for the terminal device by using the identification information. When matching fails, the target network device proceeds to perform the following steps. The failed matching case is further described below.

304. The target network device sends a permanent identifier request to the terminal device by using the target base station. Specifically, the target network device sends the permanent identifier request to the target base station, and the target base station receives the permanent identifier request. The target base station sends the permanent identifier request to the terminal device, and the terminal device receives the permanent identifier request. The permanent identifier request may include the identification information of the terminal device. The identification information of the terminal device includes the IP address, the initial first identifier, or the source first identifier of the terminal device. The permanent identifier request is used to request the terminal device to send a permanent identifier of the terminal device to the target network device. The permanent identifier may be an international mobile subscriber identity (International Mobile Subscriber Identity, IMSI), a Media Access Control (Media Access Control, MAC) address, or another permanent identifier.

305. The terminal device sends a permanent identifier response to the target network device through the target base station. Specifically, the terminal device sends the permanent identifier response to the target base station, and the target base station receives the permanent identifier response. The target base station sends the permanent identifier response to the target network device, and the target network device receives the permanent identifier response. The permanent identifier response includes the permanent identifier of the terminal device, such as an IMSI, a MAC address, or another permanent identifier. The permanent identifier response may further include identification information of the source network device. It should be noted that, steps 304 and 305 are optional depending on a specific case. Further descriptions are provided below.

306. The target network device sends a user information request to a network controller, and the network controller receives the user information request. The user information request carries the identification information of the terminal device and identification information of the target network device. The user information request may further carry a request cause. The request cause may be that the terminal device has not been registered with the target network device, for example, information matching for the terminal device fails. The identification information of the target network device may be an IP address or ID information of the target network device. The user information request is used to indicate that the target network device expects to obtain user information of the terminal device. The network controller finds the user information of the terminal device based on the identification information of the terminal device. The user information may include subscription information and/or an encryption parameter and/or an authentication parameter of the terminal device. The identification information of the terminal device carried in the user information request may be the IP address of the terminal device, the initial first identifier of the terminal device, or the permanent identifier of the terminal device.

307. The network controller sends a user information response to the target network device, and the target network device receives the user information response. The user information response includes the user information of the terminal device. After receiving the user information response, the target network device stores the user information of the terminal device in the target network device. If the identification information of the terminal device in step 301 is the IP address of the terminal device, the target network device stores the IP address of the terminal device, and makes the IP address be corresponding to the user information of the terminal device. If the identification information of the terminal device in step 301 is the initial first identifier of the terminal device, the target network device stores the initial first identifier of the terminal device, and makes the initial first identifier be corresponding to the user information and the IP address of the terminal device. If the identification information of the terminal device in step 301 is the source first identifier of the terminal device, the target network device performs step 308.

308. The target network device allocates a new first identifier to the terminal device. The target network device may further establish a correspondence between the new first identifier of the terminal device and the IP address of the terminal device. The target network device stores the new first identifier of the terminal device, and makes the new first identifier be corresponding to the user information of the terminal device. This is a method for registering the terminal device with the target network device.

309. The target network device sends a user information update complete message to the network controller, and the network controller receives the user information update complete message. The user information update complete message may include the identification information of the terminal device, the identification information of the target network device, and the identification information of the source network device. In this step, the identification information of the terminal device may include the IP address of the terminal device, or the permanent identifier, the initial first identifier, or the source first identifier of the terminal device.

310. After receiving the user information update complete message, the network controller updates a network device to which the terminal device belongs. The network controller sends a user information delete request to the source network device, and the source network device receives the user information delete request. The user information delete request carries the identification information of the terminal device and the identification information of the source network device. In this step, the identification information of the terminal device may be the IP address of the terminal device, or the permanent identifier, the initial first identifier, or the source first identifier of the terminal device.

311. After receiving the user information delete request, the source network device deletes user information of the terminal device, and the source network device sends a user information delete response to the network controller. Optionally, after receiving the user information delete request, the source network device may start a timer. Only after the timer expires, the source network device deletes the data of the terminal device.

312. After receiving the user information delete response, the network controller sends a downlink transmission target update request to a gateway, and the gateway receives the downlink transmission target update request. The downlink transmission target update request may include the identification information of the target network device, the identification information of the source network device, the identification information of the terminal device, and identification information of the gateway. The downlink transmission target update request is used to instruct to change, from the source network device to the target network device, a transmission target of downlink data sent by the gateway to the terminal device. In this step, the identification information of the terminal device may be the IP address of the terminal device.

313. After receiving the downlink transmission target update request, the gateway changes the transmission target of the downlink data for the terminal device from the source network device to the target network device. The gateway sends a downlink transmission target update response to the network controller, and the network controller receives the downlink transmission target update response. The downlink transmission target update response is used to indicate that the gateway has updated the downlink transmission target. The gateway sends the downlink data for the terminal device to the target network device. The downlink transmission target update response may include the identification information of the gateway, the identification information of the terminal device, the identification information of the target network device, and the identification information of the source network device. In this step, the identification information of the terminal device may be the IP address.

314. The network controller sends a downlink transmission target update complete message to the target network device, and the target network device receives the downlink transmission target update complete message. The downlink transmission target update complete message may include the identification information of the terminal device and the identification information of the target network device. The downlink transmission target update complete message is used to notify the target network device that the gateway has updated the downlink transmission target.

315. The target network device sends the new first identifier to the target base station, and the target base station receives the new first identifier.

316. The target base station sends the new first identifier to the terminal device. The terminal device receives the new first identifier, and the terminal device updates the first identifier of the terminal device. It should be noted that, steps 315 and 316 may be performed if step 308 is performed. Steps 315 and 316 may not be performed if step 308 is not performed.

317. The target network device may send the data received in step 302 to the gateway. In step 302, if the data received by the target network device from the target base station includes only the first identifier and does not include the IP address, before sending the data to the gateway, the target network device may obtain the IP address of the terminal device based on a correspondence between the first identifier and the IP address. Correspondingly, the data sent by the target network device to the gateway may include the IP address of the terminal device.

In step 301, the terminal device may send the data to the target base station by using the air interface resource through grant-free transmission. The terminal device achieves synchronization with the target base station without performing random access or without a need to allocate an uplink transmission resource by the target base station to the terminal device. This can reduce a signaling procedure and a latency, and improve data transmission efficiency.

Step 303 is further described below. If the identification information of the terminal device in step 301 is the source first identifier of the terminal device, the case in step 303 in which the target network device acknowledges, by using the identification information, that the terminal device has not been registered with the target network device includes: the target network device has not recorded the source first identifier.

In one case, the target network device records the source first identifier of the terminal device, but there is a possibility that first identifiers allocated by a plurality of network devices in the entire network system overlapped, and the target network device needs to perform further acknowledging based on additional information. Correspondingly, the data sent by the terminal device to the target base station may further include a sequence number of the terminal device. If the target network device acknowledges, by using the identification information, that the terminal device has not been registered with the target network device includes: a sequence number corresponding to the source first identifier recorded in the target network device is different from the sequence number of the terminal device. For example, when the target network device performs information matching for the terminal device by using the source first identifier and the sequence number of the terminal device, matching fails if the sequence number corresponding to the source first identifier recorded in the target network device is different from the sequence number of the terminal device. The sequence number may be a random sequence number in a MAC header or a field of data. The sequence number may be negotiated between the terminal device and the network device.

Alternatively, the data sent by the terminal device to the target base station may further include the IP address of the terminal device. If the target network device acknowledges, by using the identification information, that the terminal device has not been registered with the target network device includes: an IP address corresponding to the source first identifier recorded in the target network device is different from the IP address of the terminal device. For example, when the terminal device detects that the terminal device moves from a coverage area of a source base station to the coverage area of the target base station, the data sent by the terminal device to the target base station may further include the IP address of the terminal device. When the target network device performs information matching for the terminal device by using the source first identifier and the IP address of the terminal device, matching fails if the IP address corresponding to the source first identifier recorded in the target network device is different from the IP address of the terminal device.

The case in which the target network device acknowledges, by using the identification information, that the terminal device has not been registered with the target network device may further include: the target network device cannot find related information of the terminal device based on the identification information. For example, the target network device cannot find the user information of the terminal device.

If the identification information of the terminal device in step 301 is the IP address of the terminal device, if the target network device acknowledges, by using the identification information, that the terminal device has not been registered with the target network device includes: the target network device has not recorded the IP address of the terminal device.

If the identification information of the terminal device in step 301 is the initial first identifier of the terminal device, if the target network device acknowledges, by using the identification information, that the terminal device has not been registered with the target network device includes: the target network device has not recorded the initial first identifier.

If the target network device obtains the identification information of the source network device, for example, ID information or an IP address of the source network device, steps 306 and 307 may be replaced with steps 306a and 307a. If the data transmitted in steps 301 and 302 includes the ID information or the IP address of the source network device, the target network device can obtain the identification information of the source network device. Steps 306a and 307a may be specifically as follows:

306a. The target network device sends a user information request to the source network device, and the source network device receives the request. The user information request carries the identification information of the terminal device, the identification information of the source network device, and identification information of the target network device. The user information request is used to indicate that the target network device expects to obtain user information of the terminal device.

307a. The source network device sends a user information response to the target network device, and the target network device receives the user information response. The user information response includes the user information of the terminal device.

Steps 304 and 305 are optional. In a network system, if there is no possibility that first identifiers allocated by different network devices overlapped, steps 304 and 305 may not be performed. Alternatively, if the identification information of the terminal device in step 301 is the IP address of the terminal device, steps 304 and 305 may not be performed. Correspondingly, the identification information carried in the user information request in step 306 or 306a is the initial first identifier or the IP address of the terminal device. The network controller finds the user information of the terminal device based on the initial first identifier or the IP address of the terminal device. In a network system, if there is a possibility that first identifiers allocated by different network devices overlapped, or even though there is no possibility that first identifiers allocated by different network devices overlapped, steps 304 and 305 may also be performed to improve security. Correspondingly, the user information request in step 306 or 306a may carry the permanent identifier of the terminal device. The network controller may find the user information of the terminal device based on the permanent identifier of the terminal device.

A sequence of step 308 is changeable, provided that step 308 is after step 307 and before 315.

Steps 312 to 314 are optional. Steps 312 to 314 may not be performed for a terminal device without a downlink transmission request. In step 312, one or more bearers are pre-established between the target network device and the gateway, and therefore only a downlink data transmission target of the gateway needs to be updated, and there is no need to update the bearer.

After step 317 is completed, new data transmission may be further performed. New data transmission may include uplink data transmission and downlink data transmission. Specifically, uplink data transmission may include the following: The terminal device sends data to the target base station by using an air interface resource, and the target base station receives, on the air interface resource, the data sent by the terminal device. The target base station sends the data to the target network device by using a first bearer, and the target network device receives the data sent by the target base station. The data received by the target network device from the target base station includes the identification information of the terminal device. The identification information of the terminal device may be the IP address or the first identifier of the terminal device. The first identifier of the terminal device may be the initial first identifier or the new first identifier. The target network device sends the data to the gateway by using a second bearer. The data sent by the target network device to the gateway includes the IP address of the terminal device. Optionally, if the data received by the target network device from the target base station includes only the first identifier and does not include the IP address, before sending the data to the gateway, the target network device may obtain the IP address of the terminal device based on the correspondence between the first identifier and the IP address. If there are a plurality of first bearers, the target base station may select one first bearer. For example, the target base station may select a first bearer corresponding to the air interface resource that is used for sending the data by the terminal device, to perform data transmission. Alternatively, the target base station may select a first bearer corresponding to a first quality of service (quality of service, QoS) characteristic of the data sent by the terminal device. If there are a plurality of second bearers, the target network device may select one second bearer. For example, the target network device may select a second bearer corresponding to a second quality of service (QoS) characteristic of the data sent by the terminal device. Levels of the second quality of service characteristic and the first quality of service characteristic may be the same or different. A plurality of different first quality of service characteristics with adjacent levels may be combined to form a second quality of service characteristic with one level.

Downlink data transmission may include the following: The gateway sends data to the target network device by using a second bearer. The data sent by the gateway to the target network device may include the IP address of the terminal device. The target network device receives the data. The target network device sends the data to the target base station by using a first bearer. The target base station receives the data sent by the target network device. The target base station sends the data to the terminal device by using an air interface resource. The data sent by the target network device to the target base station may include the IP address of the terminal device or the first identifier of the terminal device. If the data includes the first identifier of the terminal device, the target network device may obtain the first identifier of the terminal device based on the correspondence between the IP address and the first identifier. In different cases, the first identifier may be the initial first identifier or the new first identifier. If there are a plurality of second bearers, the gateway may select one second bearer. For example, the gateway may select a second bearer corresponding to a second quality of service (QoS) characteristic of the data. If there are a plurality of first bearers, the target network device may select one first bearer. For example, the target network device may select a first bearer corresponding to a first quality of service (QoS) characteristic of the data.

If there is a possibility that first identifiers allocated by different network devices overlapped, when the terminal device roams to the coverage area of the target network device and directly performs data transmission, the first identifier may also be allocated by the target network device to another terminal. If two different terminal devices are associated only by using the first identifier, problems such as charging and transmission errors may be caused. Therefore, the data of the terminal device further needs to be identified. The IP address or the sequence number is used to acknowledge through matching whether the terminal device is an authorized terminal device of the target network device. If matching fails, it is considered that the terminal device is not an authorized terminal device of the target network device. When the target network device requests the permanent identifier from the terminal device, because two terminal devices having a same source first identifier both may receive data during air interface transmission, some content may be added to a transmitted data part. For example, the IP address or the sequence number of the terminal device may be sent to the terminal device, so that the terminal device performs data verification.

Figure 4A:
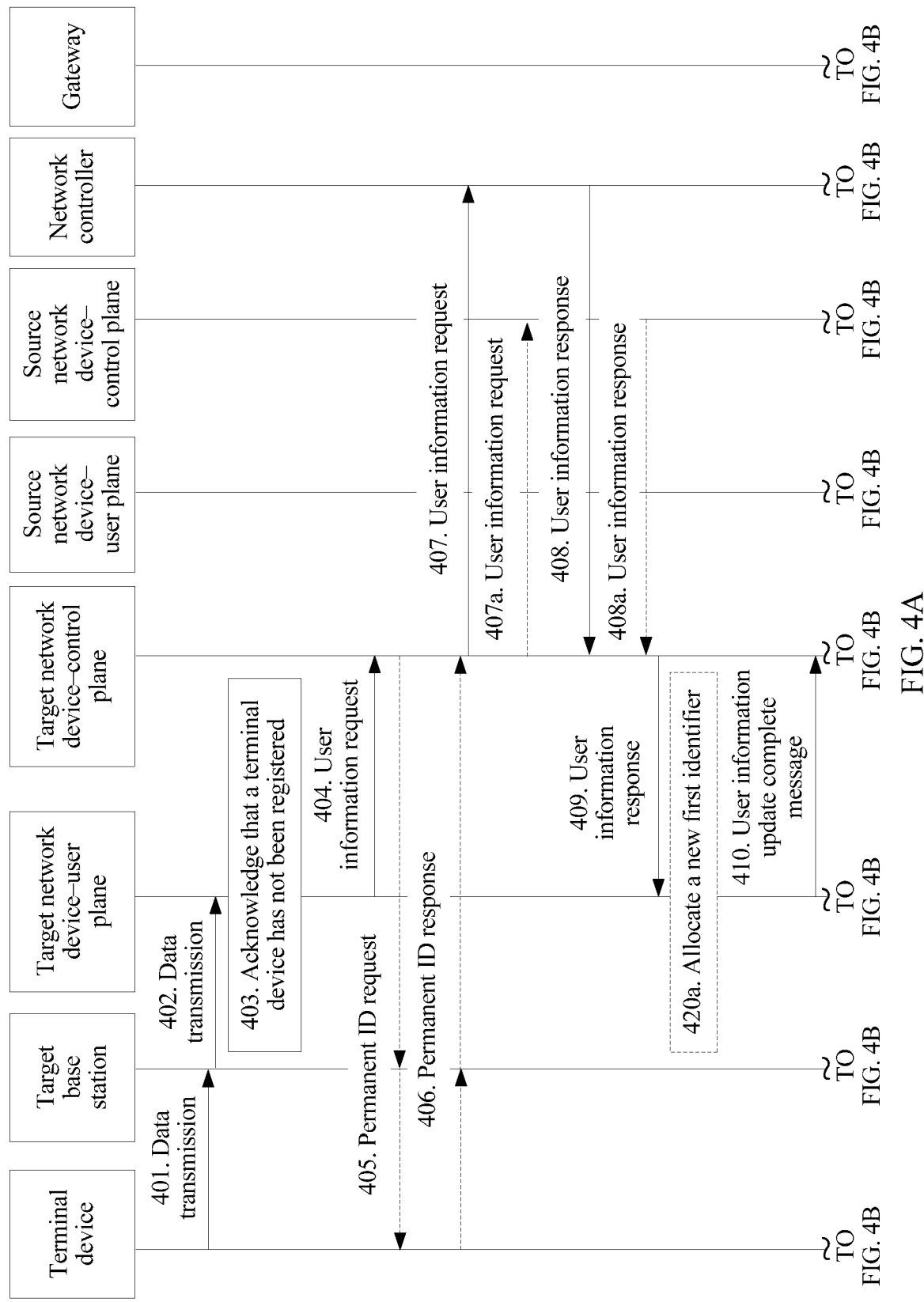
FIG. 4A and FIG. 4B are a schematic interaction diagram of a data transmission method according to another embodiment of this patent application.
Figure 4B:
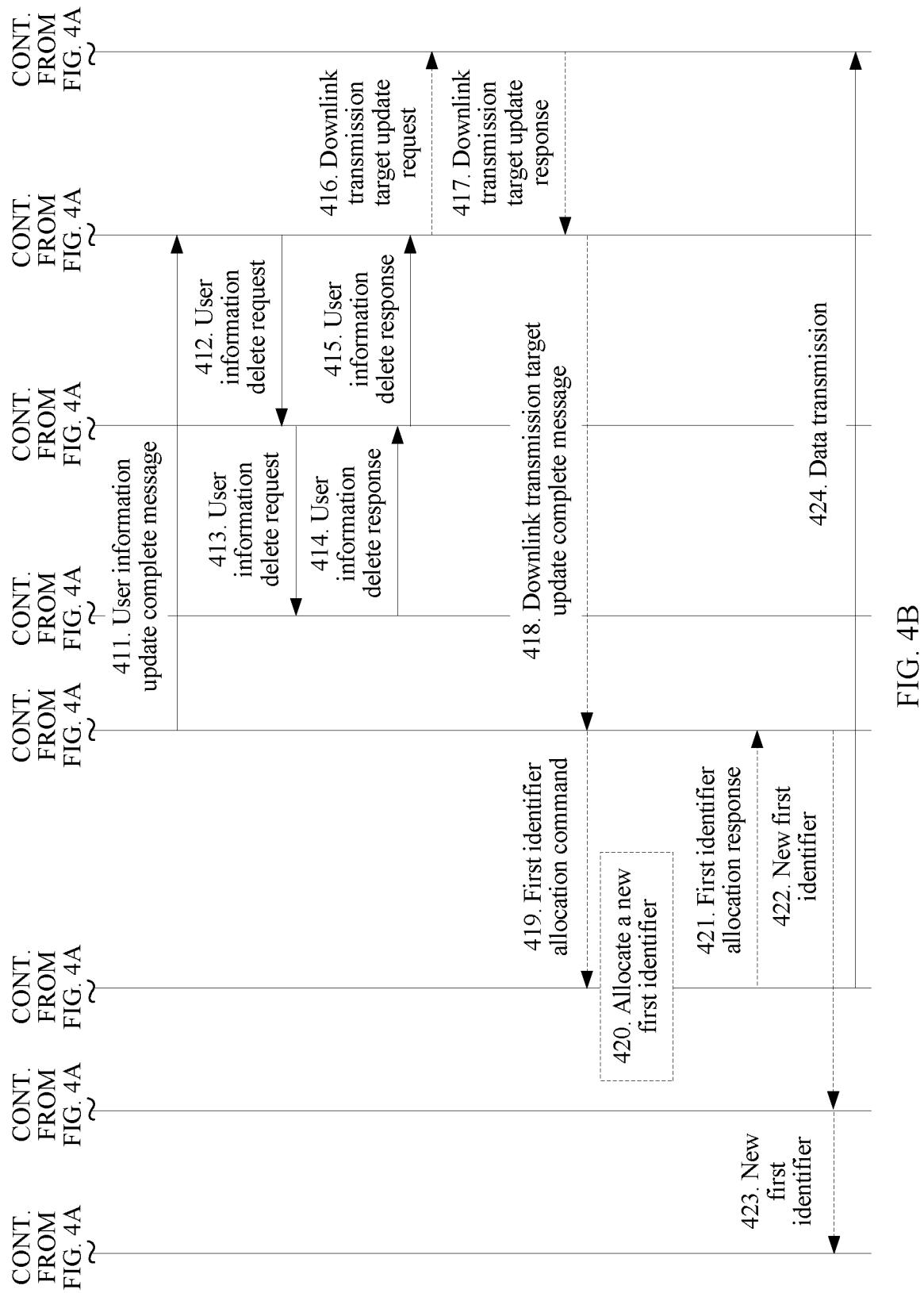

FIG. 4A and FIG. 4B are a schematic diagram of a data transmission method according to another embodiment of this patent application. This embodiment is applicable to an architecture in which a network device includes a control plane and a user plane. As shown in FIG. 4A and FIG. 4B, the method includes the following steps.

401. Step 401 is basically the same as step 301.

402. The target base station sends the data to a target network device-user plane by using a first bearer, and the target network device-user plane receives the data sent by the target base station.

403. The target network device-user plane acknowledges, by using identification information, whether the terminal device has been registered with the target network device-user plane, and if acknowledging that the terminal device has not been registered with the target network device-user plane, the target network device-user plane proceeds to perform the following steps. Optionally, the target network device-user plane may perform information matching for the terminal device by using the identification information. When matching fails, the target network device-user plane proceeds to perform the following steps. The failed matching case is further described below.

404. The target network device-user plane sends a user information request to a target network device-control plane, and the target network device-control plane receives the user information request. The user information request carries the identification information of the terminal device and identification information of the target network device-user plane. The identification information of the terminal device includes an IP address, an initial first identifier, or a source first identifier of the terminal device. The identification information of the target network device-user plane may be an IP address or ID information of the target network device-user plane. The user information request is used to indicate that the target network device-user plane expects to obtain user information of the terminal device. The user information may include subscription information and/or an encryption parameter and/or an authentication parameter of the terminal device. The user information request may further carry a request cause. The request cause may be that the terminal device has not been registered with the target network device.

405. The target network device-control plane sends a permanent identifier request to the terminal device by using the target base station. Specifically, the target network device-control plane sends the permanent identifier request to the target base station, and the target base station receives the permanent identifier request. The target base station sends the permanent identifier request to the terminal device, and the terminal device receives the permanent identifier request. The permanent identifier request may include the identification information of the terminal device. The identification information of the terminal device includes the IP address, the initial first identifier, or the source first identifier of the terminal device. The permanent identifier request is used to request the terminal device to send a permanent identifier of the terminal device to the target network device-control plane.

406. The terminal device sends a permanent identifier response to the target network device-control plane by using the target base station. Specifically, the terminal device sends the permanent identifier response to the target base station, and the target base station receives the permanent identifier response. The target base station sends the permanent identifier response to the target network device-control plane, and the target network device-control plane receives the permanent identifier response. The permanent identifier response includes the permanent identifier of the terminal device, such as an IMSI, a MAC address, or another permanent identifier. The permanent identifier response may further include identification information of a source network device-control plane and a source network device-user plane.

407. The target network device-control plane sends the user information request to a network controller, and the network controller receives the user information request. The user information request carries the identification information of the terminal device and identification information of the target network device-control plane. The identification information of the target network device-control plane may be an IP address or ID information of the target network device-control plane. The network controller finds the user information of the terminal device based on the identification information of the terminal device. The identification information of the terminal device carried in the user information request may be the IP address of the terminal device, the initial first identifier of the terminal device, or the permanent identifier of the terminal device.

408. The network controller sends a user information response to the target network device-control plane, and the target network device-control plane receives the user information response. The user information response includes the user information of the terminal device. After receiving the user information response, the target network device-control plane stores the user information of the terminal device on the target network device-control plane. If the identification information of the terminal device in step 401 is the IP address of the terminal device, the target network device-control plane stores the IP address of the terminal device, and makes the IP address be corresponding to the user information of the terminal device. If the identification information of the terminal device in step 401 is the initial first identifier of the terminal device, the target network device-control plane stores the initial first identifier of the terminal device, and makes the initial first identifier be corresponding to the user information and the IP address of the terminal device. If the identification information of the terminal device in step 401 is the source first identifier of the terminal device, the target network device-control plane subsequently performs steps 419 to 421 or step 420a, instead of storing the source first identifier.

409. The target network device-control plane sends the user information response to the target network device-user plane, and the target network device-user plane receives the user information response. The user information response includes the user information of the terminal device. After receiving the user information response, the target network device-user plane stores the user information of the terminal device on the target network device-user plane. If the identification information of the terminal device in step 401 is the IP address of the terminal device, the target network device-user plane stores the IP address of the terminal device, and makes the IP address be corresponding to the user information of the terminal device. If the identification information of the terminal device in step 401 is the initial first identifier of the terminal device, the target network device-user plane stores the initial first identifier of the terminal device, and makes the initial first identifier be corresponding to the user information and the IP address of the terminal device. If the identification information of the terminal device in step 401 is the source first identifier of the terminal device, the target network device-user plane may subsequently perform steps 419 to 421 or step 420a, instead of storing the source first identifier.

410. The target network device-user plane sends a user information update complete message to the target network device-control plane, and the target network device-control plane receives the user information update complete message. The user information update complete message may include the identification information of the terminal device and the identification information of the target network device-control plane.

411. The target network device-control plane sends the user information update complete message to the network controller, and the network controller receives the user information update complete message. The user information update complete message may include the identification information of the terminal device, the identification information of the target network device-control plane, the identification information of the source network device-control plane, the identification information of the target network device-user plane, and the identification information of the source network device-user plane. After receiving the user information update complete message, the network controller updates a network device-control plane and a network device-user plane to which the terminal device belongs.

412. The network controller sends a user information delete request to the source network device-control plane, and the source network device-control plane receives the user information delete request. The user information delete request carries the identification information of the terminal device and the identification information of the source network device-control plane. The user information delete request is used to instruct the source network device-user plane and the source network device-control plane to delete the data of the terminal device. After receiving the user information delete request, the source network device-control plane deletes the user information.

413. The source network device-control plane sends the user information delete request to the source network device-user plane, and the source network device-user plane receives the user information delete request. After receiving the user information delete request, the source network device-user plane deletes the user information of the terminal device.

414. The source network device-user plane sends a user information delete response to the source network device-control plane, and the source network device-control plane receives the user information delete response.

415. After receiving the user information delete response, the source network device-control plane deletes the data of the terminal device. The source network device-control plane sends the user information delete response to the network controller. Optionally, after receiving the user information delete request, the source network device-control plane may start a timer. Only after the timer expires, the source network device-control plane deletes the data of the terminal device.

416. After receiving the user information delete response, the network controller sends a downlink transmission target update request to a gateway, and the gateway receives the downlink transmission target update request. The downlink transmission target update request may include the identification information of the target network device-control plane and the target network device-user plane, the identification information of the source network device-control plane and the source network device-user plane, and the identification information of the terminal device. The downlink transmission target update request is used to instruct to change, from the source network device-user plane to the target network device-user plane, a target to which the gateway sends downlink data. The identification information of the terminal device may be the IP address of the terminal device.

417. After receiving the downlink transmission target update request, the gateway updates the downlink transmission target. The gateway sends a downlink transmission target update response to the network controller, and the network controller receives the downlink transmission target update response. The downlink transmission target update response is used to indicate that the gateway has updated the downlink transmission target. The gateway sends downlink data for the terminal device to the target network device-user plane. The downlink transmission target update response may include identification information of the gateway, the identification information of the target network device-user plane, the identification information of the source network device-user plan, and the identification information of the terminal device.

418. The network controller sends a downlink transmission target update complete message to the target network device-control plane, and the target network device-control plane receives the downlink transmission target update complete message. The downlink transmission target update complete message may include the identification information of the terminal device. The downlink transmission target update complete message is used to notify the target network device-control plane that the gateway has updated the downlink transmission target.

419. The target network device-control plane sends a first identifier allocation command to the target network device-user plane, and the target network device-user plane receives the first identifier allocation command. The first identifier allocation command carries the identification information of the terminal device, the identification information of the target network device-control plane, and the identification information of the target network device-user plane. The identification information of the terminal device may be the permanent identifier or the IP address.

420. After receiving the first identifier allocation command, the target network device-user plane allocates a new first identifier to the terminal device. The target network device-user plane stores the new first identifier of the terminal device, and makes the new first identifier be corresponding to the user information of the terminal device. The target network device-user plane may further establish a correspondence between the new first identifier of the terminal device and the IP address of the terminal device.

421. The target network device-user plane sends a first identifier allocation response to the target network device-control plane, and the target network device-control plane receives the first identifier allocation response. The first identifier allocation response carries the identification information of the terminal device, the identification information of the target network device-user plane, the identification information of the target network device-control plane, and the new first identifier of the terminal device.

422. The target network device-control plane sends the new first identifier to the target base station, and the target base station receives the new first identifier.

423. The target base station sends the new first identifier to the terminal device. The terminal device receives the new first identifier, and the terminal device updates the first identifier of the terminal device.

Steps 422 and 423 may be performed if step 420a or steps 419 to 421 are performed. Steps 422 and 423 may not be performed if step 420a or steps 419 to 421 are not performed.

424. Similar to step 317, the target network device-user plane sends the data to the gateway.

After step 424, new uplink data transmission and downlink data transmission may also be performed properly.

Step 403 is similar to step 303. A difference lies in that the target network device-user plane in step 403 replaces the target network device in step 303.

Optionally, if the target network device-control plane obtains the identification information of the source network device-control plane, for example, ID information or an IP address of the source network device-control plane, steps 407 and 408 may be replaced with steps 407a and 408a. Steps 407a and 408a are specifically as follows:

407a. The target network device-control plane sends the user information request to a source network device-control plane, and the source network device-control plane receives the request. The user information request carries the identification information of the terminal device and identification information of the target network device-control plane. The user information request is used to indicate that the target network device-control plane expects to obtain the user information of the terminal device.

408a. The source network device-control plane sends a user information response to the target network device-control plane, and the target network device-control plane receives the user information response. The user information response includes the user information of the terminal device.

Similar to steps 304 and 305, steps 405 and 406 are also optional.

If the identification information of the terminal device in step 401 is the first identifier, the target network device-user plane needs to allocate a new first identifier to the terminal device when in a network system, there is a possibility that first identifiers allocated by different network device-user planes overlap. Correspondingly, steps 419 to 421 may be performed. It should be noted that, steps 419 to 421 are optional. If there is no possibility that first identifiers allocated by different network device-user planes overlap, steps 419 to 421 may not be performed. Alternatively, if the identification information of the terminal device in step 401 is the IP address of the terminal device, steps 419 to 421 may not be performed. A sequence of steps 419 to 421 is adjustable, provided that steps 419 to 421 are after step 409 and before step 422.

Optionally, steps 419 to 421 may be replaced with step 420a. Step 420a is specifically as follows: After receiving the user information response, the target network device-user plane allocates a new first identifier to the terminal device. The target network device-control plane does not need to send a first identifier allocation command to the target network device-user plane. The target network device-user plane may further establish a correspondence between the new first identifier of the terminal device and the IP address of the terminal device. Correspondingly, in step 410, the user information update complete message may include the new first identifier of the terminal device.

After step 424 is completed, new data transmission may be further performed. New data transmission may include uplink data transmission and downlink data transmission. Specifically, uplink data transmission may include the following: The terminal device sends data to the target base station by using an air interface resource, and the target base station receives, on the air interface resource, the data sent by the terminal device. The target base station sends the data to the target network device-user plane by using a first bearer, and the target network device-user plane receives the data sent by the target base station. The target network device-user plane sends the data to the gateway by using a second bearer. If there are a plurality of first bearers, the target base station may select one first bearer. For example, the target base station may select a first bearer corresponding to the air interface resource that is used for sending the data by the terminal device, to perform data transmission. Alternatively, the target base station may select a first bearer corresponding to a first quality of service (QoS) characteristic of the data sent by the terminal device. If there are a plurality of second bearers, the target network device-user plane may select one second bearer. For example, the target network device-user plane may select a second bearer corresponding to a second quality of service (QoS) characteristic of the data sent by the terminal device. Levels of the second quality of service characteristic and the first quality of service characteristic may be the same or different. A plurality of different first quality of service characteristics with adjacent levels may be combined to form a second quality of service characteristic with one level.

Downlink data transmission may include the following: The gateway sends data to the target network device-user plane by using a second bearer. The target network device-user plane receives the data. The target network device-user plane sends the data to the target base station by using a first bearer. The target base station receives the data sent by the target network device-user plane. The target base station sends the data to the terminal device by using an air interface resource. If there are a plurality of second bearers, the gateway may select one second bearer. For example, the gateway may select a second bearer corresponding to a second quality of service (QoS) characteristic of the data. If there are a plurality of first bearers, the target network device-user plane may select one first bearer. For example, the target network device-user plane may select a first bearer corresponding to a first quality of service (QoS) characteristic of the data.

The target network device-user plane may also be referred to as a target network device-target user plane. The target network device-control plane may also be referred to as a target network device-target control plane.

Figure 5A:
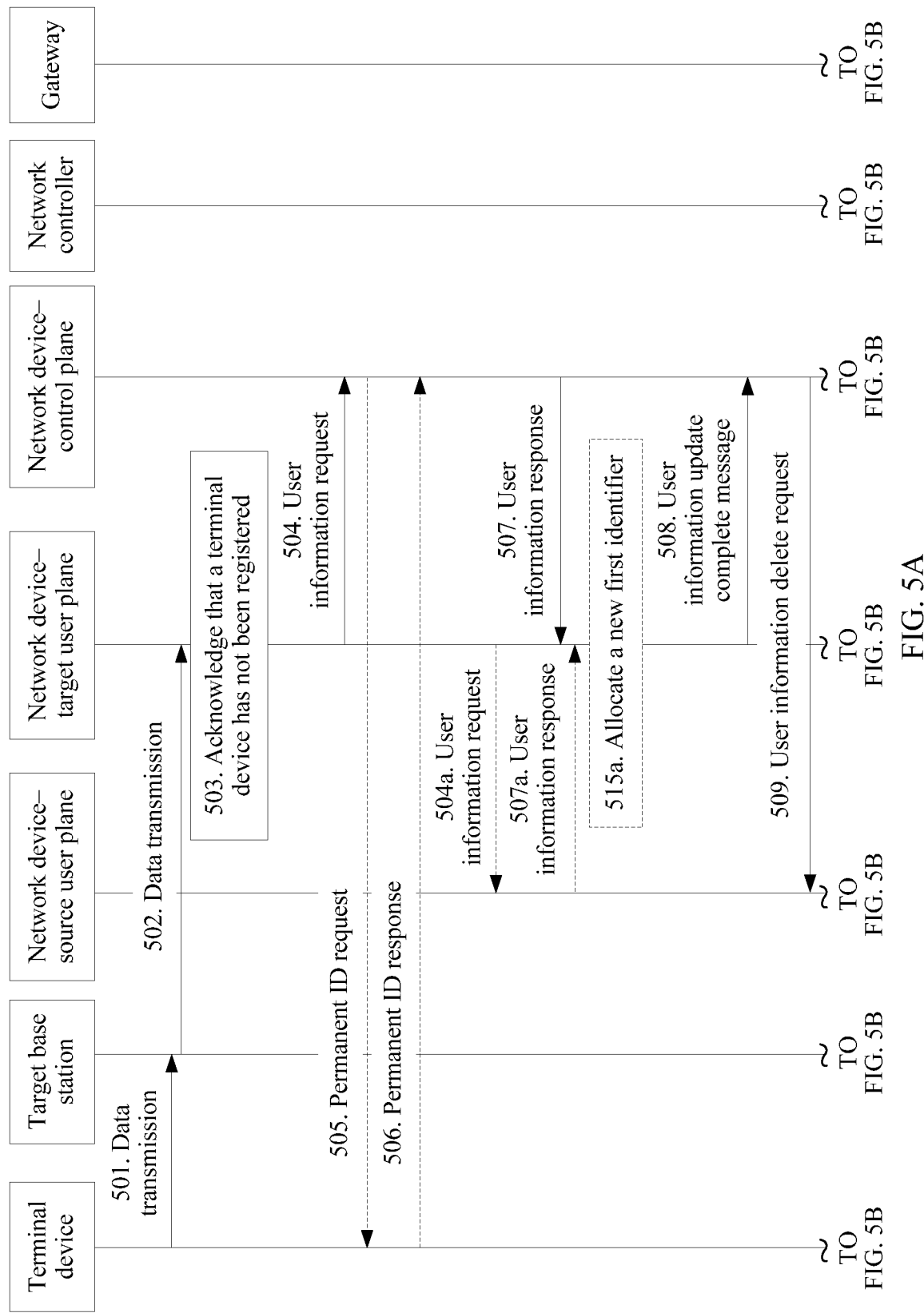
FIG. 5A and FIG. 5B are a schematic interaction diagram of a data transmission method according to another embodiment of this patent application.
Figure 5B:
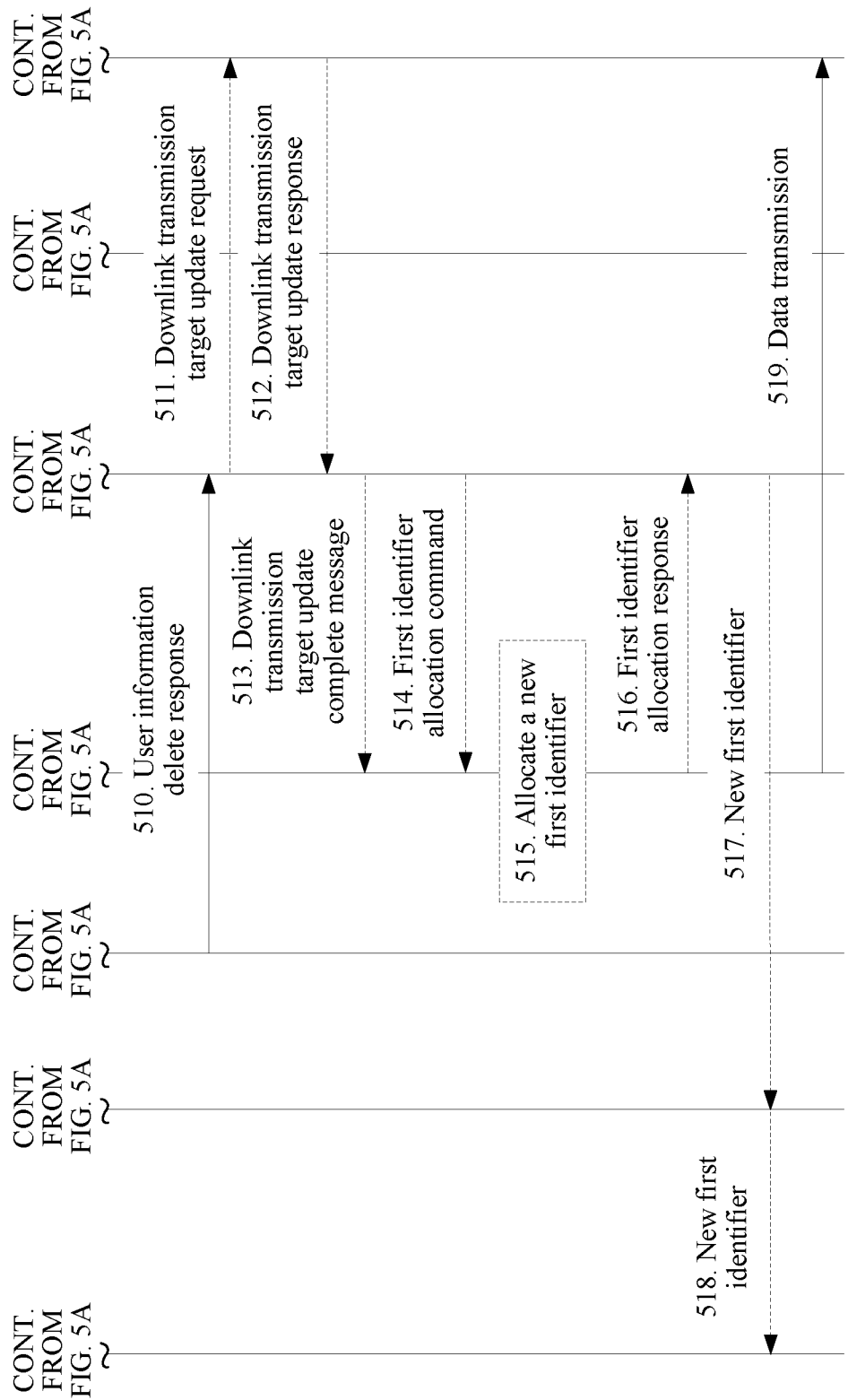

FIG. 5A and FIG. 5B are a schematic diagram of a data transmission method according to another embodiment of this patent application. In an architecture in which a network device includes a control plane and a user plane, one network device-control plane may be connected to a plurality of network device-user planes, and each network device-user plane has a different IP address. FIG. 5A and FIG. 5B are a schematic diagram of a data transmission method used when a terminal device moves under a network device-control plane. As shown in FIG. 5A and FIG. 5B, the method includes the following steps.

501. Step 501 is basically the same as step 301.

502. The target base station sends the data to a network device-target user plane by using a first bearer, and the network device-target user plane receives the data sent by the target base station.

503. The network device-target user plane acknowledges, by using identification information, whether the terminal device has been registered with the network device-target user plane, and if acknowledging that the terminal device has not been registered with the network device-target user plane, the network device-target user plane proceeds to perform the following steps. Optionally, the network device-target user plane may perform information matching for the terminal device by using the identification information. When matching fails, the network device-target user plane proceeds to perform the following steps. For step 503, refer to the descriptions of steps 403 and 303.

504. The network device-target user plane sends a user information request to a network device-control plane, and the network device-control plane receives the user information request. The user information request carries the identification information of the terminal device and identification information of the network device-target user plane. The identification information of the network device-target user plane may be an IP address or ID information of the network device-target user plane. The identification information of the terminal device carried in the user information request may be an IP address of the terminal device, an initial first identifier of the terminal device, or a source first identifier of the terminal device. The user information request is used to indicate that the network device-target user plane expects to obtain user information of the terminal device. The user information may include subscription information and/or an encryption parameter and/or an authentication parameter of the terminal device.

505. The network device-control plane sends a permanent identifier request to the terminal device by using the target base station. Specifically, the network device-control plane sends the permanent identifier request to the target base station, and the target base station receives the permanent identifier request. The target base station sends the permanent identifier request to the terminal device, and the terminal device receives the permanent identifier request. The permanent identifier request may include the identification information of the terminal device. The permanent identifier request is used to request the terminal device to send a permanent identifier of the terminal device to a target network device-control plane.

506. The terminal device sends a permanent identifier response to the network device-control plane by using the target base station. Specifically, the terminal device sends the permanent identifier response to the target base station, and the target base station receives the permanent identifier response. The target base station sends the permanent identifier response to the network device-control plane, and the network device-control plane receives the permanent identifier response. The permanent identifier response includes the permanent identifier of the terminal device, such as an IMSI, a MAC address, or another permanent identifier.

507. The network device-control plane searches for the user plane information of the terminal device based on the identification information of the terminal device. The network device-control plane sends a user information response to the network device-target user plane, and the network device-target user plane receives the user information response. The user information response includes the user information of the terminal device. After receiving the user information response, the network device-target user plane stores the user information of the terminal device on the network device-target user plane.

508. The network device-target user plane sends a user information update complete message to the network device-control plane, and the network device-control plane receives the user information update complete message. The user information update complete message may include the identification information of the terminal device, the identification information of the network device-target user plane, and identification information of a network device-source user plane.

509. After receiving the user information update complete message, the network device-control plane updates a network device-user plane to which the terminal device belongs. The network device-control plane sends a user information delete request to the network device-source user plane, and the network device-source user plane receives the user information delete request. The user information delete request carries the identification information of the terminal device and the identification information of the network device-source user plane. The user information delete request is used to instruct the network device-source user plane to delete the data of the terminal device. After receiving the user information delete request, the network device-source user plane deletes the data of the terminal device. Optionally, after receiving the user information delete request, the network device-source user plane may start a timer. Only after the timer expires, the network device-source user plane deletes the data of the terminal device.

510. The network device-source user plane sends a user information delete response to the network device-control plane, and the network device-control plane receives the user information delete response.

511. After receiving the user information delete response, the network device-control plane sends a downlink transmission target update request to a gateway, and the gateway receives the downlink transmission target update request. The downlink transmission target update request may include the identification information of the network device-target user plane, the identification information of the network device-source user plane, and the identification information of the terminal device. The downlink transmission target update request is used to instruct to change, from the network device-source user plane to the network device-target user plane, a target to which the gateway sends downlink data.

512. After receiving the downlink transmission target update request, the gateway changes the transmission target of the downlink data for the terminal device from the network device-source user plane to the network device-target user plane. The gateway sends a downlink transmission target update response to the network device-control plane, and the network device-control plane receives the downlink transmission target update response. The gateway sends the downlink data for the terminal device to the network device-target user plane.

513. The network device-control plane sends a downlink transmission target update complete message to the network device-target user plane, and the network device-target user plane receives the downlink transmission target update complete message. The downlink transmission target update complete message may include the identification information of the terminal device. The downlink transmission target update complete message is used to notify the network device-target user plane that the gateway has updated the downlink transmission target.

514. The network device-control plane sends a first identifier allocation command to a target network device-user plane, and the target network device-user plane receives the first identifier allocation command. The first identifier allocation command carries the identification information of the terminal device, the identification information of the network device-control plane, and identification information of the target network device-user plane.

515. After receiving the first identifier allocation command, the target network device-user plane allocates a new first identifier to the terminal device. The target network device-user plane stores the new first identifier of the terminal device, and makes the new first identifier be corresponding to the user information of the terminal device. The target network device-user plane may further establish a correspondence between the new first identifier of the terminal device and the IP address of the terminal device.

516. The target network device-user plane sends a first identifier allocation response to the network device-control plane, and the network device-control plane receives the first identifier allocation response. The first identifier allocation response carries the identification information of the terminal device, the identification information of the target network device-user plane, the identification information of the network device-control plane, and the new first identifier of the terminal device.

517. The network device-control plane sends the new first identifier to the target base station, and the target base station receives the new first identifier.

Steps 518 and 519 are basically the same as steps 423 and 424.

Optionally, if a network device-current user plane obtains the identification information of the network device-source user plane, such as ID information or an IP address of the network device-source user plane, steps 504 and 507 may be replaced with steps 504a and 507a. Steps 504a and 507a specifically include the following:

504a. The network device-target user plane sends a user information request to the network device-source user plane, and the network device-source user plane receives the request. The user information request carries a permanent identifier of the terminal device and identification information of the network device-target user plane. The user information request is used to indicate that the network device-target user plane expects to obtain user information of the terminal device.

507a. The network device-source user plane sends a user information response to the network device-target user plane, and the network device-target user plane receives the user information response. The user information response includes the user information of the terminal device.

Similar to steps 304 and 305, steps 505 and 506 are also optional.

In this embodiment, forwarding may also be performed by using a network controller in steps 511 and 512. Specifically, the network device-control plane sends the downlink transmission target update request to the gateway by using the network controller. The gateway sends the downlink transmission target update response to the network device-control plane by using the network controller.

If the identification information of the terminal device in step 501 is the first identifier, the target network device-user plane needs to allocate a new first identifier to the terminal device when in a network system, there is a possibility that first identifiers allocated by different network device-user planes overlap. Correspondingly, steps 514 to 516 may be performed. It should be noted that, steps 514 to 516 are optional. If there is no possibility that first identifiers allocated by different network device-user planes overlap, steps 514 to 516 may not be performed. Alternatively, if the identification information of the terminal device in step 501 is the IP address of the terminal device, steps 514 to 516 may not be performed. A sequence of steps 514 to 516 is adjustable, provided that steps 514 to 516 are after step 507 and before step 517.

Steps 514 to 516 may alternatively be replaced with step 515a. For step 515a, refer to the descriptions of step 420a.

The network device-target user plane may also be referred to as a target network device-target user plane. The network device-control plane may also be referred to as a target network device-control plane.

The solutions provided in the embodiments of the present invention are described above mainly from a perspective of interaction between network elements. It can be understood that, to implement the foregoing functions, the network elements include corresponding hardware structures and/or software modules for executing the functions. A person skilled in the art should be easily aware that, in combination with the embodiments disclosed in this specification, this patent application can be implemented by hardware, or a combination of hardware and computer software. Whether a function is executed by hardware or by computer software driving hardware depending on particular applications and design constraint conditions of the technical solutions. A person skilled in the art may use different methods to implement the described functions for each particular application, but it should not be considered that the implementation goes beyond the scope of this patent application.

Figure 6:
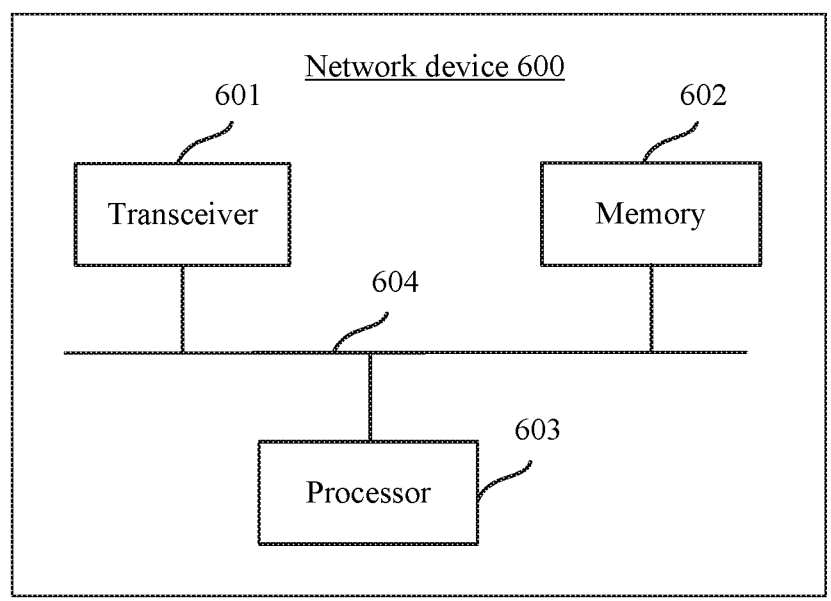
FIG. 6 is a schematic structural diagram of a network device according to another embodiment of this patent application.

This patent application further provides apparatus embodiments for implementing the steps and the methods in the foregoing method embodiments. FIG. 6 is a possible schematic structural diagram of a target network device or a target network device-target user plane in the foregoing embodiment.

As shown in FIG. 6, a network device 600 includes a transceiver 601, a memory 602, and a processor 603. The memory 602 is configured to store an instruction. The processor 603 is separately connected to the memory 602 and the transceiver 601, and is configured to execute the instruction, to perform the following steps when executing the instruction: receiving data sent by a target base station by using the transceiver 601, where the data is sent by a terminal device to the target base station, and the data includes identification information of the terminal device; if it is acknowledged, by using the identification information, that the terminal device has not been registered with the network device, obtaining user information of the terminal device by using the transceiver 601; and after obtaining the user information of the terminal device, sending the data to a gateway by using the transceiver 601.

Optionally, the transceiver 601 and the memory 602 may be directly connected to the processor 603. Alternatively, as shown in FIG. 6, the transceiver 601 and the memory 602 are connected to a bus 604, and the processor 603 is also connected to the bus 604.

Optionally, the identification information of the terminal device is a source first identifier of the terminal device, and the source first identifier is allocated by a source network device to the terminal device. The processor 603 further performs the following steps when executing the instruction: after obtaining the user information of the terminal device, allocating a new first identifier to the terminal device, and sending, by using the transceiver 601, the new first identifier to the terminal device by using the target base station.

Optionally, the identification information of the terminal device is a source first identifier of the terminal device, and the source first identifier is allocated by a source network device to the terminal device. The processor 603 further performs the following steps when executing the instruction: after obtaining the user information of the terminal device, allocating a new first identifier to the terminal device, and sending, by using the transceiver 601, the new first identifier to the terminal device by using the target base station.

Optionally, the memory 602 is further configured to store information. The case in which the terminal device has not been registered with the network device includes: the information stored in the memory 602 does not include the source first identifier.

Optionally, the data further includes a sequence number of the terminal device. The memory 602 is further configured to store information. The case in which the terminal device has not been registered with the network device includes: a sequence number corresponding to the source first identifier in the information stored in the memory 602 is different from the sequence number of the terminal device.

Optionally, the data further includes an IP address of the terminal device. The memory 602 is further configured to store information. The case in which the terminal device has not been registered with the network device includes: an IP address corresponding to the source first identifier in the information stored in the memory 602 is different from the IP address of the terminal device.

Optionally, the identification information of the terminal device is an initial first identifier of the terminal device, and the initial first identifier is a first identifier allocated to the terminal device by a network device to which the terminal device is attached. The memory 602 is further configured to store information. The case in which the terminal device has not been registered with the network device includes: the information stored in the memory 602 does not include the initial first identifier.

Optionally, the memory 602 is further configured to store information. The case in which the terminal device has not been registered with the network device includes: the information stored in the memory 602 does not include the IP address.

Optionally, that the processor 603 performs the step of obtaining user information of the terminal device by using the transceiver 601 includes: the processor 603 sends a user information request to a network controller by using the transceiver 601; and the processor 603 receives, by using the transceiver 601, a user information response sent by the network controller. The user information response includes the user information of the terminal device.

Optionally, that the processor 603 performs the step of obtaining user information of the terminal device by using the transceiver 601 includes: the processor 603 sends a user information request to the source network device by using the transceiver 601; and the processor 603 receives, by using the transceiver 601, a user information response sent by the source network device. The user information response includes the user information of the terminal device.

Optionally, when the network device shown in FIG. 6 is a target network device-target user plane, that the processor 603 performs the step of obtaining user information of the terminal device by using the transceiver 601 includes: the processor 603 sends a user information request to a target network device-control plane by using the transceiver 601; and the processor 603 receives, by using the transceiver 601, a user information response sent by the target network device-control plane. The user information response includes the user information of the terminal device.

Optionally, when the network device shown in FIG. 6 is a target network device-target user plane, that the processor 603 performs the step of obtaining user information of the terminal device by using the transceiver 601 includes: the processor 603 sends a user information request to a source network device-source user plane by using the transceiver 601; and the processor 603 receives, by using the transceiver 601, a user information response sent by the source network device-source user plane. The user information response includes the user information of the terminal device.

Figure 7:
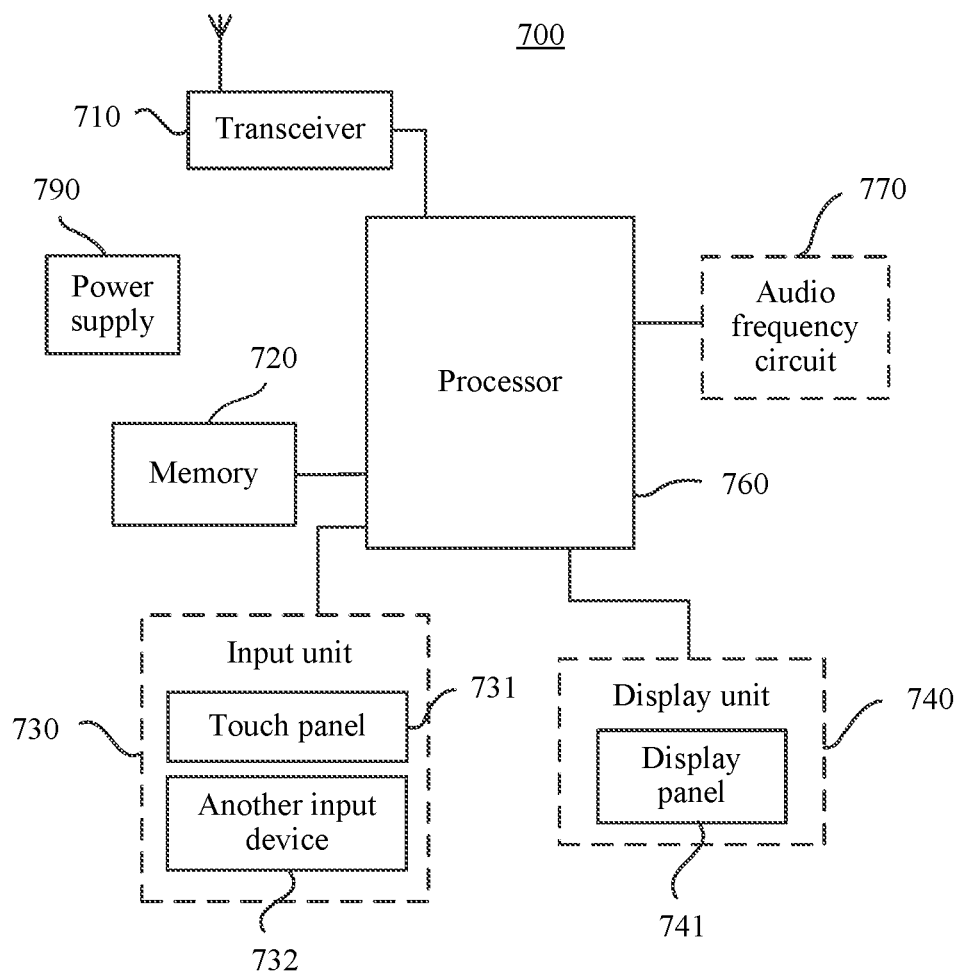
FIG. 7 is a schematic structural diagram of a terminal device according to another embodiment of this patent application.

FIG. 7 is a possible schematic structural diagram of a terminal device in the foregoing embodiment. As shown in FIG. 7, a terminal device 700 includes a transceiver 710, a memory 720, and a processor 760. The memory 720 is configured to store an instruction. The processor 760 is separately connected to the memory 720 and the transceiver 710, and is configured to execute the instruction, to perform the following steps when executing the instruction: sending data to a target base station by using the transceiver 710, so that the target base station sends the data to a target network device, where the data includes a source first identifier of the terminal device, and the source first identifier is a first identifier allocated by a source network device to the terminal device; and when the target network device acknowledges, by using the source first identifier, that the terminal device has not been registered with the target network device but the target network device obtains user information, receiving a new first identifier from the target base station by using the transceiver 710. The new first identifier is allocated by the target network device to the terminal device.

The terminal device 700 may further include an input unit 730. The input unit 730 may be configured to: receive an entered digit or entered character information, and generate signal input related to user settings and function control of the terminal device 700. Specifically, in the embodiment shown in FIG. 7, the input unit 730 may include a touch panel 731. The touch panel 731, also referred to as a touchscreen, may collect a touch operation (such as an operation performed by a user on the touch panel 731 or near the touch panel 731 by using any proper object or accessory such as a finger or a stylus) performed by the user on or near the touch panel 731, and drive a corresponding connection apparatus based on a preset program. Optionally, the touch panel 731 may include two parts: a touch detection apparatus and a touch controller. The touch detection apparatus detects a touch position of the user, detects a signal brought by the touch operation, and transfers the signal to the touch controller. The touch controller receives touch information from the touch detection apparatus, converts the touch information into touch point coordinates, and then sends the touch point coordinates to the processor 760, and can receive and execute a command sent by the first processor 760. In addition, the touch panel 731 may be implemented in a plurality of types, such as a resistive type, a capacitive type, an infrared type, and a surface acoustic wave type. In addition to the touch panel 731, the input unit 730 may further include another input device 732. The another input device 732 may include but is not limited to one or more of a physical keyboard, a function key (for example, a volume control key or an on/off key), a trackball, a mouse, a joystick, and the like.

The terminal device 700 may further include a display unit 740, and the display unit 740 may be configured to display information entered by a user or information provided for a user, and various menu interfaces of the terminal device 700. The display unit 740 may include a display panel 741. Optionally, the display panel 741 may be configured in a form of an LCD (Liquid Crystal Display, liquid crystal display), an OLED (Organic Light-Emitting Diode, organic light-emitting diode), or the like.

The terminal device 700 may further include a power supply 790, to supply power to the entire terminal device 700. The terminal device 700 may further include an audio frequency circuit 770, to process audio signals of the entire terminal device.

Figure 8:
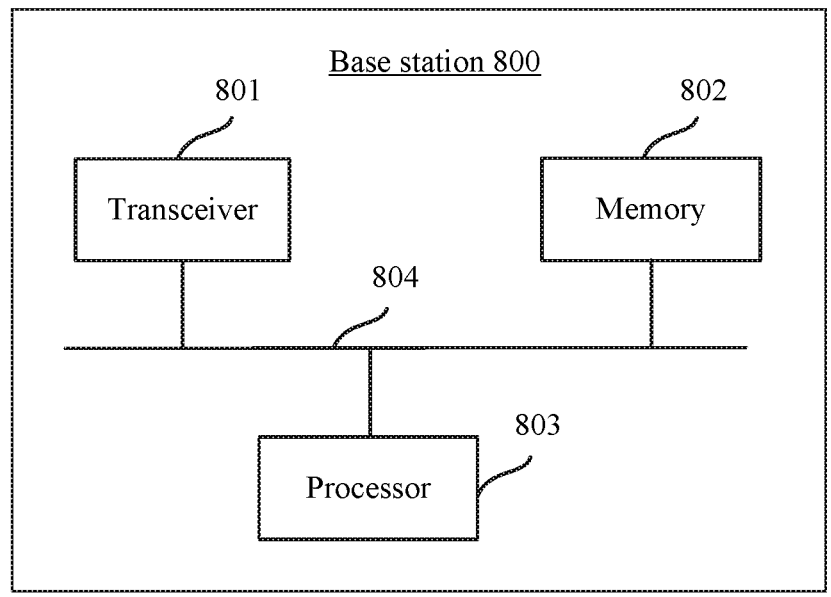
FIG. 8 is a schematic structural diagram of a base station according to another embodiment of this patent application.

FIG. 8 is a possible schematic structural diagram of a target base station in the foregoing embodiment. As shown in FIG. 8, a base station 800 includes a transceiver 801, a memory 802, and a processor 803. The memory 802 is configured to store an instruction. The processor 803 is separately connected to the memory 802 and the transceiver 801, and is configured to execute the instruction, to perform the following steps when executing the instruction: receiving, by using the transceiver 801, data sent by a terminal device, where the data includes a source first identifier of the terminal device, and the source first identifier is a first identifier allocated by a source network device to the terminal device; sending the data to a target network device by using the transceiver 801; when the target network device acknowledges, by using the source first identifier, that the terminal device has not been registered with the target network device but the target network device obtains user information, receiving a new first identifier from the target network device by using the transceiver 801; and sending the new first identifier to the terminal device by using the transceiver 801. The new first identifier is allocated by the target network device to the terminal device.

Optionally, the transceiver 801 and the memory 802 may be directly connected to the processor 803. Alternatively, the transceiver 801 and the memory 802 are connected to a bus 804, and the processor 803 is also connected to the bus 804.

Figure 9:
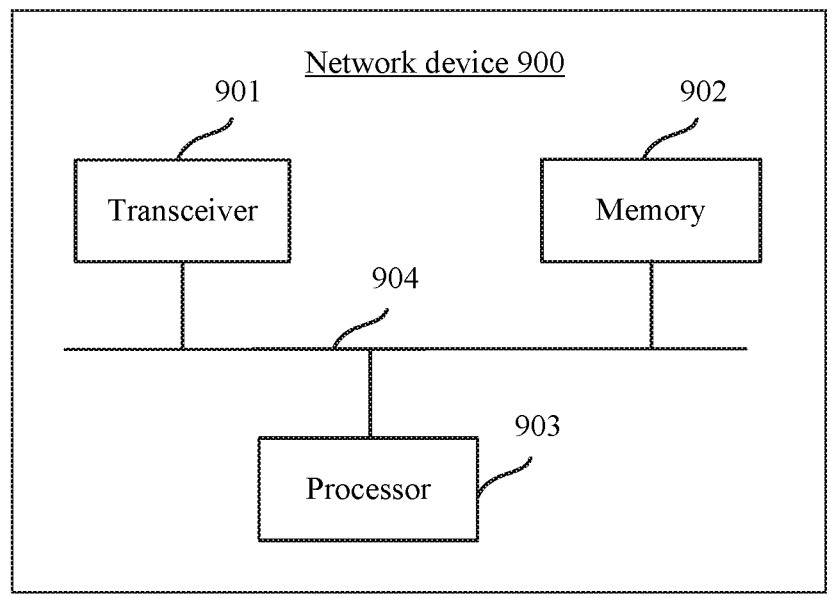
FIG. 9 is a schematic structural diagram of a network device according to another embodiment of this patent application.

FIG. 9 is a possible schematic structural diagram of a target network device-control plane in the foregoing embodiment. As shown in FIG. 9, a network device 900 includes a transceiver 901, a memory 902, configured to store an instruction; and a processor 903 separately connected to the memory 902 and the transceiver 901. The processor 903 is configured to execute the instruction, to perform the following steps when executing the instruction: when a terminal device has not been registered with a target network device-target user plane, receiving, by the processor 903 by using the transceiver 901, a user information request from the target network device-target user plane; and sends a user information response to the target network device-target user plane by using the transceiver 901. The user information response includes user information of the terminal device.

Optionally, the transceiver 901 and the memory 902 may be directly connected to the processor 903. Alternatively, the transceiver 901 and the memory 902 are connected to a bus 904, and the processor 903 is also connected to the bus 904.

Optionally, the processor 903 further performs the following steps when executing the instruction: sending a first identifier allocation command to the target network device-target user plane by using the transceiver 901; and receiving, by using the transceiver 901, a first identifier allocation response sent by the target network device-target user plane. The first identifier allocation response includes a new first identifier of the terminal device.

Optionally, the processor 903 further performs the following steps when executing the instruction: sending a downlink transmission target update request to a gateway by using the transceiver 901, to request to change, to the target network device-target user plane, a target to which the gateway sends downlink data; and receiving, by using the transceiver 901, a downlink transmission target update response sent by the gateway. The downlink transmission target update response is used to indicate that the gateway has changed the downlink data transmission target of the terminal device to the target network device-target user plane.

Figure 10:
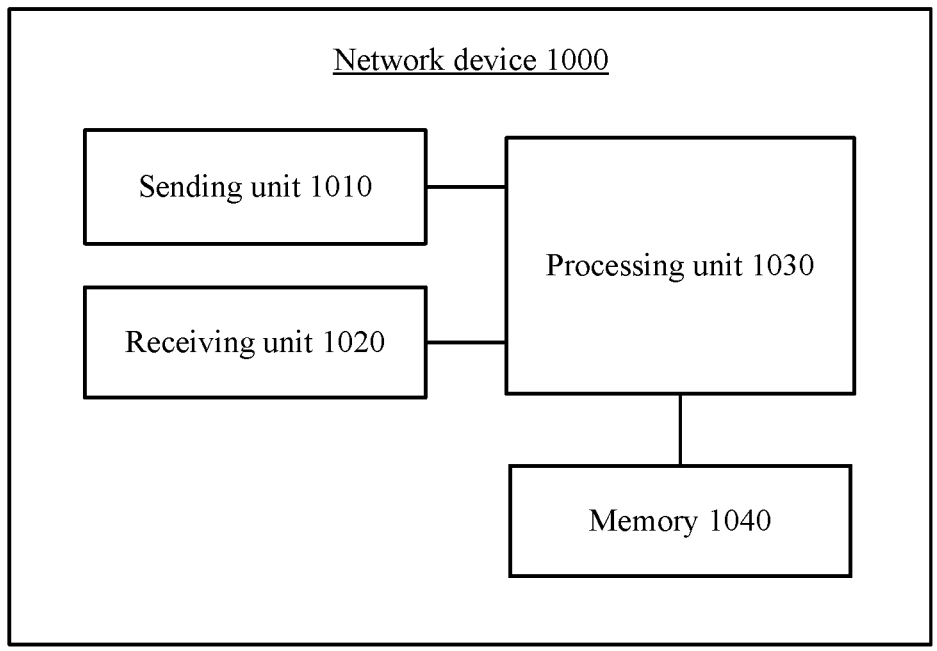
FIG. 10 is a schematic structural diagram of a network device according to another embodiment of this patent application.

FIG. 10 is a possible schematic structural diagram of a target network device or a target network device-user plane in the foregoing embodiment. As shown in FIG. 10, a network device includes a receiving unit 1020, a processing unit 1030, and a sending unit 1010. The receiving unit 1020 is configured to receive data sent by a target base station. The data is sent by a terminal device to the target base station, and the data includes identification information of the terminal device. The processing unit 1030 is configured to: if it is acknowledged, by using the identification information, that the terminal device has not been registered with the target network device, obtain user information of the terminal device by using the sending unit 1010 and the receiving unit 1020. The sending unit 1010 is configured to: when the processing unit 1030 obtains the user information of the terminal device, send the data to a gateway by the target network device.

Optionally, the identification information of the terminal device is a source first identifier of the terminal device, and the source first identifier is a first identifier allocated by a source network device to the terminal device. The processing unit 1030 is further configured to: after the target network device obtains the user information of the terminal device, allocate a new first identifier to the terminal device, and send, by the target network device, the new first identifier to the terminal device by using the target base station.

Optionally, the network device may further include a memory 1040. The case in which the terminal device has not been registered with the target network device includes: the memory 1040 has not stored the source first identifier.

Optionally, the data further includes a sequence number of the terminal device. The network device may further include a memory 1040. The case in which the terminal device has not been registered with the target network device includes: a sequence number corresponding to the source first identifier stored in the memory 1040 is different from the sequence number of the terminal device.

Optionally, the data further includes an IP address of the terminal device. The network device may further include a memory 1040. The case in which the terminal device has not been registered with the target network device includes: an IP address corresponding to the source first identifier stored in the memory 1040 is different from the IP address of the terminal device.

Optionally, the identification information of the terminal device is an initial first identifier of the terminal device, and the initial first identifier is a first identifier allocated by a network device to which the terminal device is attached. The network device may further include a memory 1040. The case in which the terminal device has not been registered with the target network device includes: the memory 1040 has not stored the initial first identifier.

Optionally, the identification information of the terminal device may be an IP address of the terminal device. The network device may further include a memory 1040. The case in which the terminal device has not been registered with the target network device includes: the memory 1040 has not stored the IP address.

Optionally, that the processing unit 1030 obtains user information of the terminal device by using the sending unit 1010 and the receiving unit 1020 includes: the processing unit 1030 sends a user information request to a network controller by using the sending unit 1010; and the processing unit 1030 receives, by using the receiving unit 1020, a user information response sent by the network controller. The user information response includes the user information of the terminal device.

Optionally, that the processing unit 1030 obtains user information of the terminal device by using the sending unit 1010 and the receiving unit 1020 includes: the processing unit 1030 sends a user information request to the source network device by using the sending unit 1010; and the processing unit 1030 receives, by using the receiving unit 1020, a user information response sent by the source network device. The user information response includes the user information of the terminal device.

Optionally, when the network device shown in FIG. 10 is a target network device-target user plane, that the processing unit 1030 obtains user information of the terminal device by using the sending unit 1010 and the receiving unit 1020 includes: the processing unit 1030 sends a user information request to a target network device-control plane by using the sending unit 1010; and the processing unit 1030 receives, by using the receiving unit 1020, a user information response sent by the target network device-control plane. The user information response includes the user information of the terminal device.

Optionally, when the network device shown in FIG. 10 is a target network device-target user plane, that the processing unit 1030 obtains user information of the terminal device by using the sending unit 1010 and the receiving unit 1020 includes: the processing unit 1030 sends a user information request to a source network device-source user plane by using the sending unit 1010; and the processing unit 1030 receives, by using the receiving unit 1020, a user information response sent by the source network device-source user plane. The user information response includes the user information of the terminal device.

Optionally, that the data is sent by a terminal device to the target base station includes: the data is sent by the terminal device to the target base station through grant-free transmission.

Figure 11:
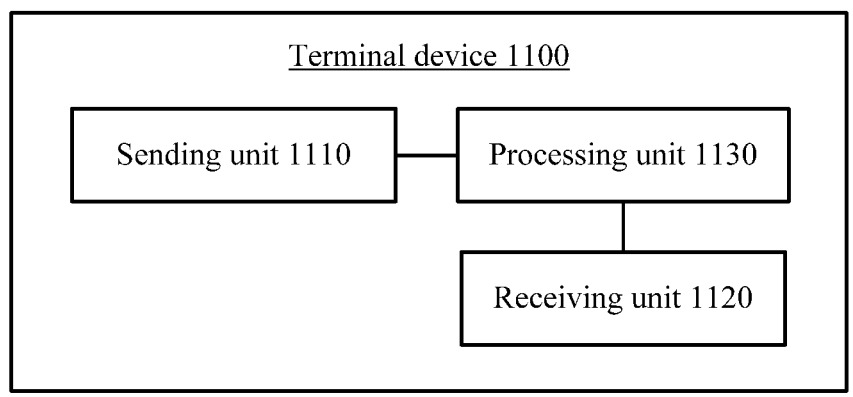
FIG. 11 is a schematic structural diagram of a terminal device according to another embodiment of this patent application.

FIG. 11 is a possible schematic structural diagram of a terminal device in the foregoing embodiment. As shown in FIG. 11, a terminal device 1100 includes a sending unit 1110 and a receiving unit 1120. The sending unit 1110 is configured to send data to a target base station, so that the target base station sends the data to a target network device. The data includes a source first identifier of the terminal device, and the source first identifier is a first identifier allocated by a source network device to the terminal device. The receiving unit 1120 is configured to: when the target network device acknowledges, by using the source first identifier, that the terminal device has not been registered with the target network device but the target network device obtains user information, receive a new first identifier from the target base station. The new first identifier is allocated by the target network device to the terminal device.

The terminal device 1100 may further include a processing unit 1130, configured to process the data of the terminal device 1100. The processing unit 1130 may be further configured to control the sending unit 1110 and the receiving unit 1120.

Figure 12:
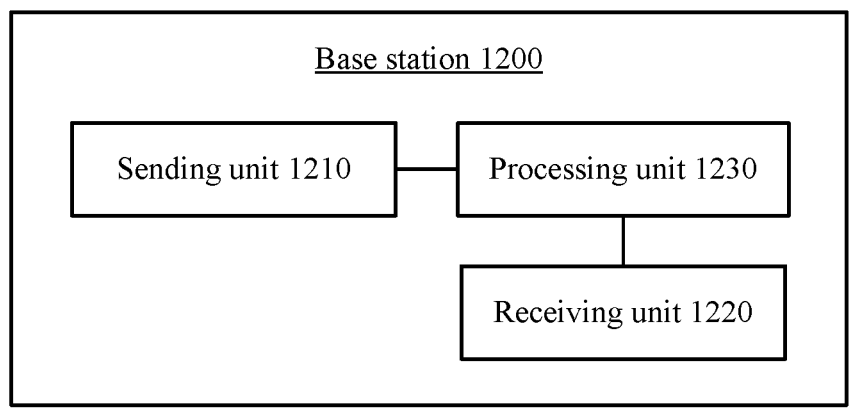
FIG. 12 is a schematic structural diagram of a base station according to another embodiment of this patent application.

FIG. 12 is a possible schematic structural diagram of a target base station in the foregoing embodiment. As shown in FIG. 12, base station 1200 includes a sending unit 1210 and a receiving unit 1220. The receiving unit 1220 is configured to receive data sent by a terminal device. The data includes a source first identifier of the terminal device. The source first identifier is a first identifier allocated by a source network device to the terminal device. The sending unit 1210 is configured to send the data to a target network device. The receiving unit 1220 is further configured to: when the target network device acknowledges, by using the source first identifier, that the terminal device has not been registered with the target network device but the target network device obtains user information, receive a new first identifier from the target network device. The new first identifier is allocated by the target network device to the terminal device. The sending unit 1210 is further configured to send the new first identifier to the terminal device.

The base station 1200 may further include a processing unit 1230, configured to process the data of the base station 1200. The processing unit 1230 may be further configured to control the sending unit 1210 and the receiving unit 1220.

Figure 13:
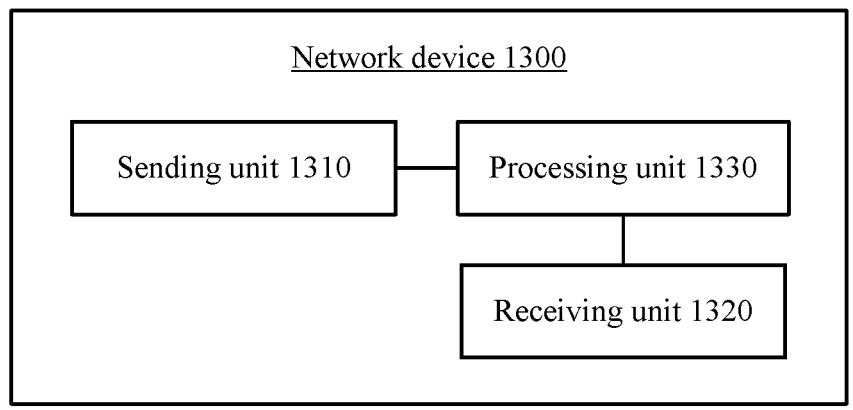
FIG. 13 is a schematic structural diagram of a network device according to another embodiment of this patent application.

FIG. 13 is a possible schematic structural diagram of a target network device-control plane in the foregoing embodiment. As shown in FIG. 13, a network device 1300 includes a sending unit 1310 and a receiving unit 1320. The receiving unit 1320 is configured to: when a terminal device has not been registered with a target network device-target user plane, receive a user information request from the target network device-target user plane. The sending unit 1310 is configured to send a user information response to the target network device-target user plane. The user information response includes user information of the terminal device.

Optionally, the sending unit 1310 is further configured to: after sending the user information response to the target network device-target user plane, send a first identifier allocation command to the target network device-target user plane. The receiving unit 1320 is further configured to receive a first identifier allocation response sent by the target network device-target user plane. The first identifier allocation response includes a new first identifier of the terminal device.

Optionally, the sending unit 1310 is further configured to: after sending the user information response to the target network device-target user plane, send a downlink transmission target update request to a gateway, to request to change, to the target network device-target user plane, a target to which the gateway sends downlink data. The receiving unit 1320 is further configured to receive a downlink transmission target update response sent by the gateway. The downlink transmission target update response is used to indicate that the gateway has changed the downlink data transmission target of the terminal device to the target network device-target user plane.

The network device 1300 may further include a processing unit 1330, configured to process data of the network device 1300. The processing unit 1330 may be further configured to control the sending unit 1310 and the receiving unit 1320.

The sending unit may be implemented by using a transmitter. The receiving unit may be implemented by using a receiver.

This patent application may be applied to machine type communication (Machine Type Communication, "MTC").

It should be understood that, to make the embodiment document of the present invention brief and clear, technical features and descriptions in one of the foregoing embodiments may be considered to be applicable to other embodiments. For example, the technical features of the method embodiment are applicable to the apparatus embodiments or other method embodiments, and details are not described in other embodiments one by one again.

In the embodiments of the present invention, although steps of the method are numbered, this is merely for ease of description, and does not indicate that the steps of the method need to be performed based on the numbers. A person skilled in the art may appropriately adjust a sequence of the steps of the method.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should be further understood that determining B according to A does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this patent application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this patent application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separated parts may or may not be physically separated, and parts displayed as units may or may not be physical units, may be located in one position, or may be distributed on a plurality of network units. Some or all of the units may be selected according to actual requirements to achieve the objectives of the solutions of the embodiments of the present invention.

In addition, functional units in the embodiments of this patent application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this patent application essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of this patent application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

With descriptions of the foregoing implementations, a person skilled in the art may clearly understand that this patent application may be implemented by hardware, firmware or a combination thereof. When this patent application is implemented by software, the foregoing functions may be stored in a computer-readable medium or transmitted as an instruction or code in the computer-readable medium. The computer-readable medium includes a computer storage medium and a communications medium. The communications medium includes any medium that enables a computer program to be transmitted from one place to another. The storage medium may be any available medium accessible to a computer. The following provides an example but does not impose a limitation. The computer-readable medium may include a RAM, a ROM, an EEPROM, a CD-ROM, another optical disc storage or disk storage medium, another magnetic storage device, or any other medium that can carry or store expected program code in a form of an instruction or a data structure and can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL), or wireless technologies such as infrared ray, radio, and microwave, the coaxial cable, optical fiber cable, twisted pair, DSL or wireless technologies such as infrared ray, radio, and microwave are included in fixation of a medium to which they belong. For example, a disk (Disk) and a disc (disc) used in this patent application include a compact disc (CD), a laser disc, an optical disc, a digital versatile disc (DVD), a floppy disk, and a Blu-ray disc. The disk generally copies data by a magnetic means, and the disc copies data optically by a laser means. The foregoing combination should also be included in the protection scope of the computer-readable medium.

The foregoing descriptions are merely specific embodiments of this patent application, but are not intended to limit the protection scope of this patent application. Any modification or replacement readily figured out by a person skilled in the art within the technical scope disclosed in this patent application shall fall within the protection scope of this patent application. Therefore, the protection scope of this patent application shall be subject to the protection scope of the claims.

What is claimed is:

1. A method of data transmission, comprising:
   receiving, by a target network device from a target base station, data sent by a terminal device to the target base station, the data comprising identification information of the terminal device;
   when the target network device acknowledges, by using the identification information, that the terminal device has not been registered with the target network device, obtaining, by the target network device, user information of the terminal device, wherein the user information includes subscription information, an encryption parameter and/or an authentication parameter of the terminal device; and after the target network device obtains the user information of the terminal device, sending, by the target network device, the data to a gateway.

2. The method according to claim 1, wherein
the identification information of the terminal device is a source first identifier of the terminal device, and the source first identifier is a first identifier allocated by a source network device to the terminal device; and
after the target network device obtains the user information of the terminal device, the target network device further allocates a new first identifier to the terminal device, and the target network device sends the new first identifier to the terminal device by using the target base station.

3. The method according to claim 2, wherein
when the target network device acknowledges, by using the identification information, that the terminal device has not been registered with the target network device comprises: the target network device has not recorded the source first identifier.

4. The method according to claim 2, wherein
the data further comprises a sequence number of the terminal device; and
when the target network device acknowledges, by using the identification information, that the terminal device has not been registered with the target network device comprises: a sequence number corresponding to the source first identifier recorded in the target network device is different from the sequence number of the terminal device.

5. The method according to claim 2, wherein
the data further comprises an IP address of the terminal device; and
when the target network device acknowledges, by using the identification information, that the terminal device has not been registered with the target network device comprises: an IP address corresponding to the source first identifier recorded in the target network device is different from the IP address of the terminal device.

6. A method of data transmission, comprising:
sending, by a terminal device, data to a target base station, so that the target base station sends the data to a target network device, wherein the data comprises a source first identifier of the terminal device, and the source first identifier is a first identifier allocated by a source network device to the terminal device; and
when the target network device acknowledges, by using the source first identifier, that the terminal device has not been registered with the target network device but the target network device obtains user information, receiving, by the terminal device, a new first identifier from the target base station, wherein the user information includes subscription information and/or an encryption parameter, an authentication parameter of the terminal device, and wherein the new first identifier is allocated by the target network device to the terminal device.

7. A network device, comprising:
a transceiver;
a memory, configured to store an instruction; and
a processor separately connected to the memory and the transceiver, configured to execute the instruction, to enable the network device to perform:
receiving, by the transceiver, data sent by a target base station, wherein the data is sent by a terminal device to the target base station, and the data comprises identification information of the terminal device;
when it is acknowledged, by using the identification information, that the terminal device has not been registered with the network device, obtaining user information of the terminal device by using the transceiver, wherein the user information include subscription information, an encryption parameter and/or an authentication parameter of the terminal device; and
after obtaining the user information of the terminal device, sending the data to a gateway by using the transceiver.

8. The network device according to claim 7, wherein
the identification information of the terminal device is a source first identifier of the terminal device, and the source first identifier is allocated by a source network device to the terminal device; and
the processor further performs the following steps when executing the instruction: after obtaining the user information of the terminal device, allocating a new first identifier to the terminal device, and sending, by using the transceiver, the new first identifier to the terminal device by using the target base station.

9. The network device according to claim 8, wherein
the memory is further configured to store information, and the case in which the terminal device has not been registered with the network device comprises: the information stored in the memory does not comprise the source first identifier.

10. The network device according to claim 8, wherein
the data further comprises a sequence number of the terminal device; and
the memory is further configured to store information, and the case in which the terminal device has not been registered with the network device comprises: a sequence number corresponding to the source first identifier in the information stored in the memory is different from the sequence number of the terminal device.

11. The network device according to claim 8, wherein
the data further comprises an IP address of the terminal device; and
the memory is further configured to store information, and the case in which the terminal device has not been registered with the network device comprises: an IP address corresponding to the source first identifier in the information stored in the memory is different from the IP address of the terminal device.

12. A terminal device, comprising:
a transceiver;
a memory, configured to store an instruction; and
a processor separately connected to the memory and the transceiver, configured to execute the instruction, to enable the terminal device to perform the following:
sending data to a target base station by using the transceiver, so that the target base station sends the data to a target network device, wherein the data comprises a source first identifier of the terminal device, and the source first identifier is a first identifier allocated by a source network device to the terminal device; and
when the target network device acknowledges, by using the source first identifier, that the terminal device has not been registered with the target network device but the target network device obtains user information, receiving a new first identifier from the target base station by using the transceiver, wherein the user information include subscription information and/or an encryption parameter and/or an authentication parameter of the terminal device, and wherein the new first identifier is allocated by the target network device to the terminal device.

\* \* \* \* \*